US012158124B2

(12) United States Patent
Long et al.

(10) Patent No.: US 12,158,124 B2
(45) Date of Patent: Dec. 3, 2024

(54) CARBON CANISTER WITH INTEGRATED FUEL TANK ISOLATION VALVE

(71) Applicant: Stant USA Corp., Connersville, IN (US)

(72) Inventors: John C. Long, Connersville, IN (US); George J. Mitri, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 17/850,547

(22) Filed: Jun. 27, 2022

(65) Prior Publication Data

US 2023/0008621 A1 Jan. 12, 2023

Related U.S. Application Data

(60) Provisional application No. 63/220,130, filed on Jul. 9, 2021.

(51) Int. Cl.
*F02M 25/08* (2006.01)

(52) U.S. Cl.
CPC .... *F02M 25/0836* (2013.01); *F02M 25/0854* (2013.01); *F02M 2025/0845* (2013.01)

(58) Field of Classification Search
CPC ........... F02M 25/0836; F02M 25/0854; F02M 2025/0845
See application file for complete search history.

(56) References Cited

U.S. PATENT DOCUMENTS

| | | | |
|---|---|---|---|
| 3,628,517 | A | 12/1971 | Soberski |
| 3,741,232 | A | 6/1973 | Soberski |
| 4,193,383 | A | 3/1980 | Rogers |
| 5,809,978 | A | 9/1998 | Krimmer et al. |
| 6,328,021 | B1 | 12/2001 | Perry et al. |
| 6,450,153 | B1 | 9/2002 | Perry |
| 6,453,942 | B1 | 9/2002 | Perry |
| 6,460,566 | B1 | 10/2002 | Perry et al. |
| 6,470,861 | B1 | 10/2002 | Perry |
| 6,470,908 | B1 | 10/2002 | Perry |
| 6,474,313 | B1 | 11/2002 | Perry et al. |
| 6,474,314 | B1 | 11/2002 | Perry et al. |
| 6,478,045 | B1 | 11/2002 | Perry |
| 6,484,555 | B1 | 11/2002 | Perry et al. |
| 6,502,560 | B1 | 1/2003 | Perry |
| 6,505,514 | B1 | 1/2003 | Perry |
| 6,514,326 | B1 | 2/2003 | Hara et al. |
| 6,585,230 | B2 | 7/2003 | Perry |

(Continued)

FOREIGN PATENT DOCUMENTS

| | | |
|---|---|---|
| CN | 205654455 | 10/2016 |
| CN | 206338141 U | 7/2017 |

(Continued)

OTHER PUBLICATIONS

PCT International Search Report and Written Opinion for Application No. PCT/US2022/035115, dated Oct. 19, 2022, 13 pages.

*Primary Examiner* — Xiao En Mo

(74) *Attorney, Agent, or Firm* — Barnes & Thornburg LLP

(57) ABSTRACT

A fuel tank vent valve includes a venting apparatus for regulating discharge of fuel vapor from a fuel tank and admission of outside air into a fuel tank. The vent valve is used to regulate pressure in a fuel tank.

18 Claims, 16 Drawing Sheets

(56) References Cited

U.S. PATENT DOCUMENTS

| | | | |
|---|---|---|---|
| 6,623,012 | B1 | 9/2003 | Perry et al. |
| 6,701,901 | B2 | 3/2004 | Perry et al. |
| 6,739,573 | B1 | 5/2004 | Balsdon |
| 6,840,232 | B2 | 1/2005 | Perry |
| 6,863,095 | B2 | 3/2005 | Osaki et al. |
| 6,910,500 | B2 | 6/2005 | Perry et al. |
| 6,983,641 | B1 | 1/2006 | Perry et al. |
| 7,025,084 | B2 | 4/2006 | Perry et al. |
| 7,040,301 | B2 | 5/2006 | Perry et al. |
| 7,225,798 | B2 | 6/2007 | Wang et al. |
| 7,249,595 | B2 | 7/2007 | Mills et al. |
| 7,472,694 | B2 | 1/2009 | King |
| 8,578,914 | B2 | 11/2013 | Lee et al. |
| 9,031,721 | B2 | 5/2015 | Fukui et al. |
| 9,145,051 | B2 | 9/2015 | Dudar et al. |
| 9,163,592 | B2 | 10/2015 | Kim et al. |
| 9,216,646 | B2 | 12/2015 | Yang et al. |
| 9,217,397 | B2 | 12/2015 | Peters et al. |
| 9,243,592 | B2 | 1/2016 | Dudar et al. |
| 9,322,342 | B2 | 4/2016 | Dudar et al. |
| 9,376,969 | B2 | 6/2016 | Yang et al. |
| 9,415,680 | B2 | 8/2016 | Dudar et al. |
| 9,429,114 | B2 | 8/2016 | Dudar et al. |
| 9,599,071 | B2 | 3/2017 | Dudar |
| 9,669,825 | B1 | 6/2017 | Dudar |
| 9,834,205 | B1 | 12/2017 | Dudar |
| 10,167,823 | B2 | 1/2019 | Dudar |
| 10,183,660 | B2 | 1/2019 | Dudar |
| 10,458,366 | B2 | 10/2019 | Brock |
| 10,549,628 | B2 | 2/2020 | Hagen |
| 10,611,625 | B2 | 4/2020 | Dudar |
| 10,850,609 | B2 | 12/2020 | Vulkan et al. |
| 10,907,583 | B2 | 2/2021 | Honda et al. |
| 2008/0223343 | A1 | 9/2008 | Ammermann |
| 2009/0101119 | A1 | 4/2009 | Ammermann |
| 2011/0203947 | A1* | 8/2011 | Ogawa ................. F02M 25/089 206/216 |
| 2014/0150661 | A1 | 6/2014 | Himmel |
| 2016/0186700 | A1* | 6/2016 | Nishiura ............ F02M 25/0854 123/519 |
| 2016/0245238 | A1* | 8/2016 | Ueda .................. F02M 25/0854 |
| 2018/0119650 | A1 | 5/2018 | Brock et al. |
| 2019/0084410 | A1* | 3/2019 | Bhandari ........... F02M 25/0836 |
| 2019/0249624 | A1* | 8/2019 | Seki ................... B01D 53/0407 |
| 2019/0368431 | A1 | 12/2019 | Dudar |
| 2021/0254583 | A1 | 8/2021 | Krishnan et al. |

FOREIGN PATENT DOCUMENTS

| | | | |
|---|---|---|---|
| CN | 206436819 | U | 8/2017 |
| CN | 104582992 | B | 11/2017 |
| CN | 108035826 | A | 5/2018 |
| CN | 110385981 | A | 10/2019 |
| CN | 209539471 | U | 10/2019 |
| CN | 111439113 | A | 7/2020 |
| CN | 211422789 | | 9/2020 |
| CN | 111927959 | A | 11/2020 |
| CN | 109458276 | B | 12/2020 |
| JP | 2006258101 | | 9/2006 |
| KR | 1020210057508 | | 5/2021 |

* cited by examiner

CARBON CANISTER WITH INTEGRATED FUEL TANK ISOLATION VALVE

PRIORITY CLAIM

This application claims priority to U.S. Provisional Application Ser. No. 63/220,130 filed Jul. 9, 2021, which is incorporated by reference herein.

BACKGROUND

The present disclosure relates to fuel tank vent valves, and particularly to venting apparatus for regulating discharge of fuel vapor from a fuel tank and admission of outside air into the fuel tank. More particularly, the present disclosure relates to a fuel tank pressure regulator including a fuel tank vent valve.

Vehicle fuel systems include valves associated with a fuel tank and configured to vent pressurized or displaced fuel vapor from the vapor space in the fuel tank to a fuel-vapor recovery canister located outside of the fuel tank. The canister is designed to capture and store hydrocarbons entrained in fuel vapors that are displaced and generated in the fuel tank during a typical vehicle refueling operation or that are otherwise vented from the fuel tank.

The vapor recovery canister is also coupled to a vehicle engine and to a purge vacuum source. Typically, vacuum is applied to the vapor recovery canister by the purge vacuum source whenever the vehicle engine is running in an effort to suck hydrocarbons captured and stored in the canister into the engine for combustion.

SUMMARY

A tank venting system in accordance with the present disclosure includes a housing, a carbon bed located in a storage cavity defined by the housing, and a fuel tank isolation valve for regulating flow of fuel vapor between a fuel tank and the housing in a vehicle. The housing, or fuel-vapor recovery canister, is in fluid communication between the fuel tank and an engine in the vehicle to absorb hydrocarbons in the fuel vapor flowing into and out of the fuel tank. The flow of fuel vapor is controlled to maintain the pressure of fuel vapor in the fuel tank at a certain pressure level or within a certain pressure range.

In the illustrative embodiments, the housing includes a media storage body formed to define a storage cavity that contains the carbon bed. The media storage body is further formed to define is that interconnects the storage cavity of the media storage body and an atmosphere surrounding the tank venting system in fluid communication, a second vapor port that interconnects the storage cavity of the media storage body and an engine in fluid communication, and a third vapor port in fluid communication with the fuel tank.

In the illustrative embodiments, the media storage body is further formed to define a vapor-transfer passageway that interconnects the storage cavity and the third vapor port to enable transfer of fuel vapor flowing from the fuel tank through the third port to the storage cavity of the media storage body and vice versa. The fuel tank isolation valve of the tank venting system is located in the vapor-transfer passageway so as to regulate flow of fuel vapor in the vapor-transfer passageway between the third vapor port and the storage cavity of the media storage body.

In the illustrative embodiments, the fuel tank isolation valve has a normally closed mode and several different open modes to regulate the flow of fuel vapor between the fuel tank and the media storage body based on different conditions of the system. The vapor-transfer passageway and vapor ports formed in housing integrates the fuel tank isolation valve in the housing to eliminate leak paths between the fuel tank and the engine.

In the illustrative embodiments, the media storage body includes a storage body canister that defines a portion of the storage cavity and a storage body closure. The storage body closure couples to the storage body canister to close an bottom opening to the storage cavity of the storage body canister. The storage body canister of the media storage body, the vapor ports, and the vapor-transfer passageway may be formed as a single extruded component of plastic material.

Additional features of the present disclosure will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
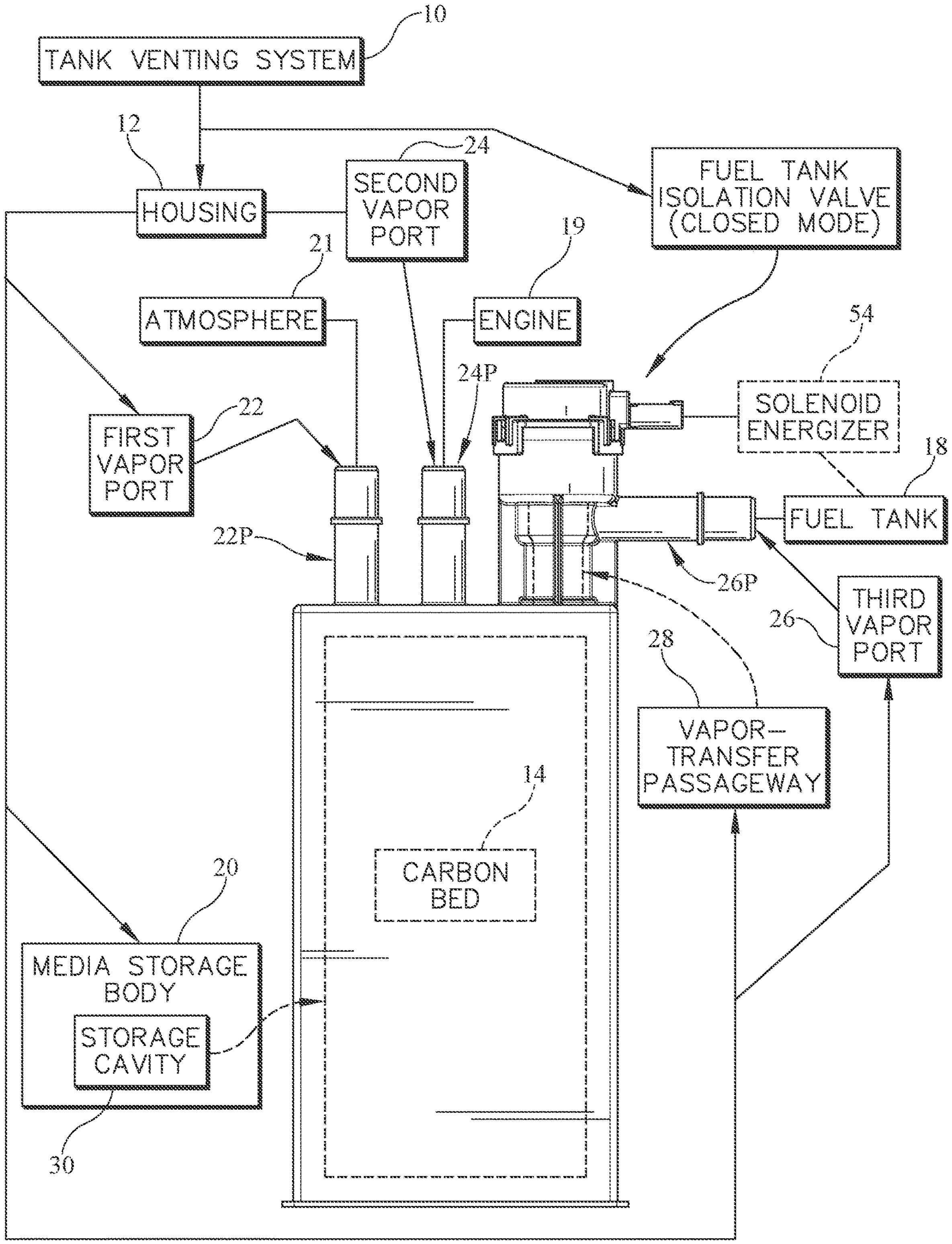
FIG. 1 is a diagrammatic elevation view of a tank venting system in accordance with the present disclosure comprising a housing shaped to include a media storage body defining a storage cavity and a plurality of vapor ports arranged to interconnect the storage cavity with a surrounding atmosphere, an engine, and a fuel tank; a carbon bed located in the storage cavity of the media storage body; and a fuel tank isolation valve to regulate flow of fuel vapor between the fuel tank and the storage cavity.

For the purposes of promoting an understanding of the principles of the disclosure, reference will now be made to a number of illustrative embodiments illustrated in the drawings and specific language will be used to describe the same.

Fuel tank venting system 10 comprises a housing 12, a carbon bed 14 located in a storage cavity 30 of the housing 12, and a fuel tank isolation valve 16 associated with that housing 12 as suggested in FIG. 1. Housing 12 includes a media storage body 20 formed to define the storage cavity 30, a plurality of vapor ports 22, 24, 26, and a vapor-transfer passageway 28 arranged to interconnect storage cavity 30 of media storage body 20 and a fuel tank port 26 associated with a fuel tank 18 in fluid communication so that pressurized fuel vapor can flow back and forth between fuel tank 18 and media storage body 20. Fuel tank isolation valve 16 is located in the vapor-transfer passageway 28 of the housing 12 and is used to control flow of air and fuel vapor between fuel tank 18 and media storage body 20 as suggested in FIGS. 5-16. Fuel tank isolation valve 16 is used onboard a vehicle (not shown) including an engine 19 and a purge vacuum source (not shown) coupled to engine 19 and media storage body 20 as shown, for example, in FIG. 1.

Figure 2:
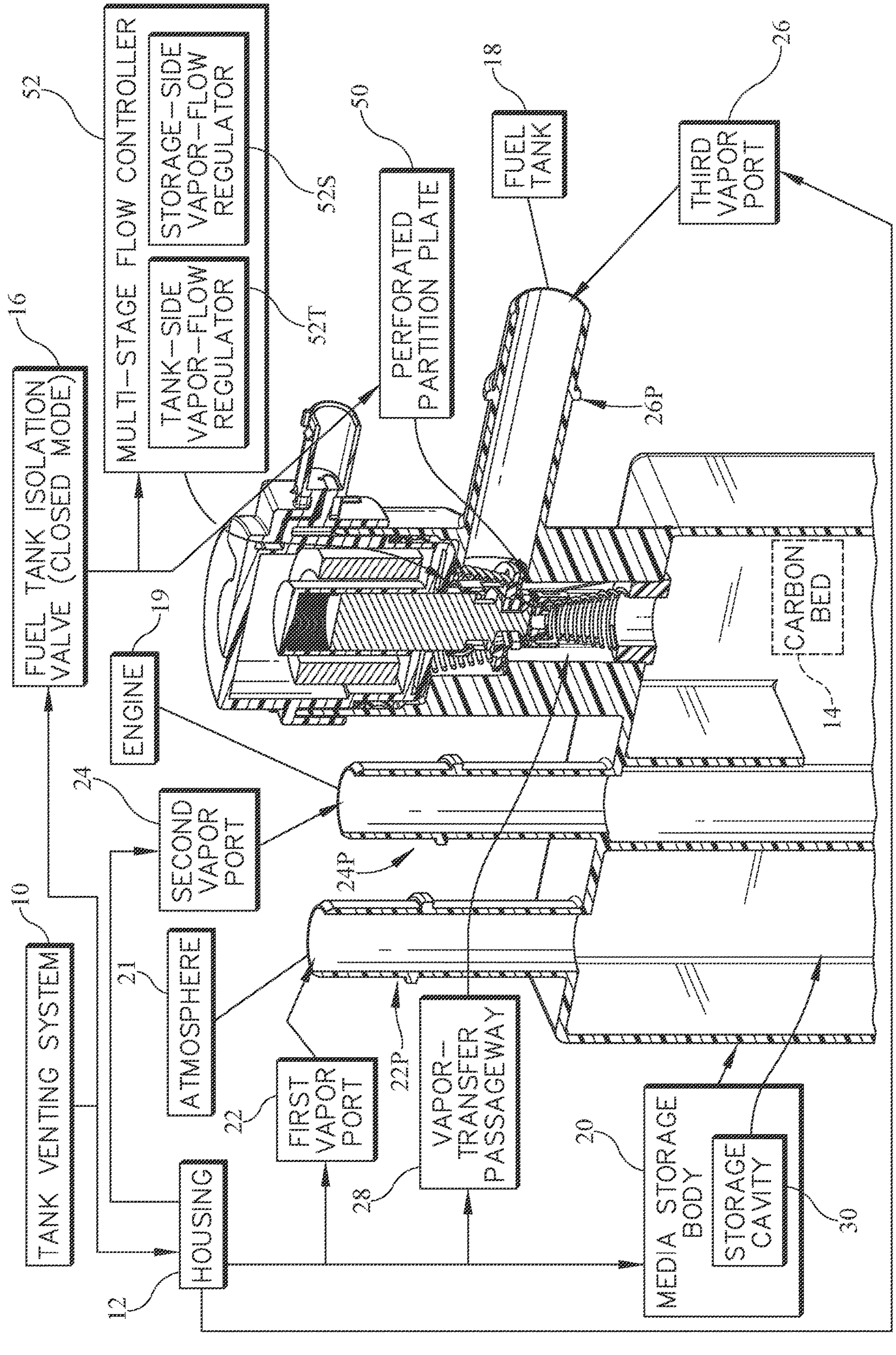
FIG. 2 is a sectional perspective view of the tank venting system of FIG. 1 showing the media storage body further defines a vapor-transfer passageway arranged to interconnect the storage cavity with a vapor port connected to the fuel tank to enable transfer of fuel vapor flowing from the fuel tank through the fuel-tank vapor port to the storage cavity of the media storage body and vice versa, and further showing the fuel tank isolation valve includes a stationary perforated partition plate located in the vapor-transfer passageway and a multi-stage flow controller components that are able to move relative to the stationary perforated partition plate for normally closing, partly opening, and opening vent apertures formed in the perforated partition plate in different operating modes of the fuel tank isolation valve to regulate flow of fuel vapor between the fuel tank and the media storage body.
Figure 3:
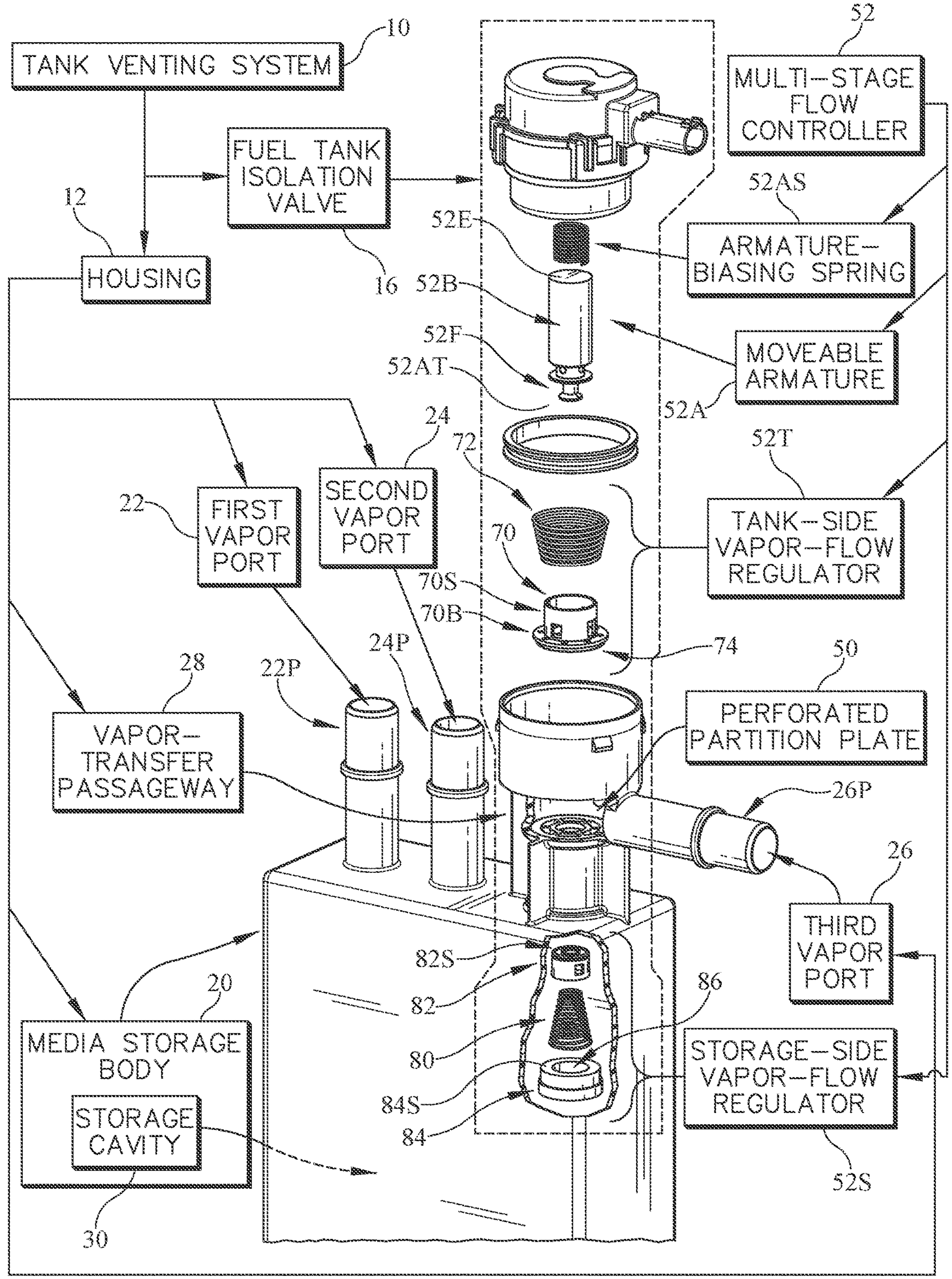
FIG. 3 is an exploded view of the tank venting system of FIG. 2 showing the fuel tank isolation valve includes the perforated partition plate that divides the vapor-transfer passageway to form a tank-side chamber and a storage-side chamber, a tank-side vapor-flow regulator configured to be located in the tank-side chamber, a spring-biased, solenoid-activated movable armature, and a storage-side vapor-flow regulator configured to be located in the storage-side chamber that cooperates with the tank-side vapor-flow regulator and the movable armature to regulate the flow through the perforated partition plate.

Housing 12 is a carbon canister in the illustrative embodiment and includes carbon bed 14 in the storage cavity 30 to absorb hydrocarbons in the fuel vapor flowing into and out of the media storage body 20 through each of plurality of vapor ports 22, 24, 26. Media storage body 20 of the housing 12 is also formed to define a first vapor port 22, a second vapor port 24, and a third vapor port 26 as shown in FIGS. 1-3. First vapor port 22, also referred to as atmosphere vapor port 22, is arranged to interconnect storage cavity 30 of media storage body 20 and an atmosphere 21 surrounding tank venting system 10 in fluid communication. Second vapor port 24, also referred to as engine vapor port 24, is arranged to interconnect storage cavity 30 of media storage body 20 and engine 19 in fluid communication. Third vapor port 26, also referred to as fuel tank vapor port 26, is in fluid communication with fuel tank 18.

Vapor-transfer passageway 28 is arranged to interconnect storage cavity 30 and third vapor port 26 to enable transfer fuel vapor flowing from fuel tank 18 through third vapor port 26 to storage cavity 30 of media storage body 20 and to enable transfer of hydrocarbon-laden vapor flowing from storage cavity 30 of media storage body 20 through third vapor port 26 to fuel tank 18. Fuel tank isolation valve 16 is located in vapor-transfer passageway 28 formed in housing 12 to normally to isolate fuel tank 18 from the media storage body 20 to block flow of fuel vapor between tank 18 and media storage body 20. Fuel tank isolation valve 16 is configured to have four opened modes to allow for temporary fuel vapor flow between tank 18 and media storage body 20 during four different tank events.

In vehicles with a normal internal combustion engine, the fuel vapor from the fuel tank is vented directly to the surrounding atmosphere. Directly venting the fuel vapor to the surrounding atmosphere may be harmful to people and/or the environment.

However, in partially hybrid electric vehicles (PHEV), the internal combustion engine included in the vehicle operates intermittently and therefore the fuel tank system is frequently closed off from the atmosphere when not in use (i.e. the engine is not being used). Closing the system off from the atmosphere may reduce the harmful emissions to the surrounding environment, but may create a need to control/regulate the fuel vapor in the system.

The fuel vapor in the fuel tank may therefore be at a higher pressure or a lower vacuum pressure than normal engines, which may make opening fuel system lines when ready for use a challenge. Further, if the increased pressure in the fuel tank is not released, the fuel tank may become damaged or even explode.

Fuel tank systems may include a fuel tank isolation valve to control the flow fuel vapor and air between the fuel tank and a canister used to store the pressurized fuel vapor to release built up pressure in the fuel tank at different stages. The canister is configured to "clean" fuel vapor vented from the fuel tank during tank refueling. The canister may be in fluid communication with the engine, the fuel tank, and the atmosphere, which provides several leak paths for the fuel vapor. Vapor-transfer passageway 28 and vapor ports 22, 24, 26 formed in housing 12 integrates fuel tank isolation valve 16 in housing 12 to eliminate leak paths between fuel tank 18 and engine 19.

Figure 5:
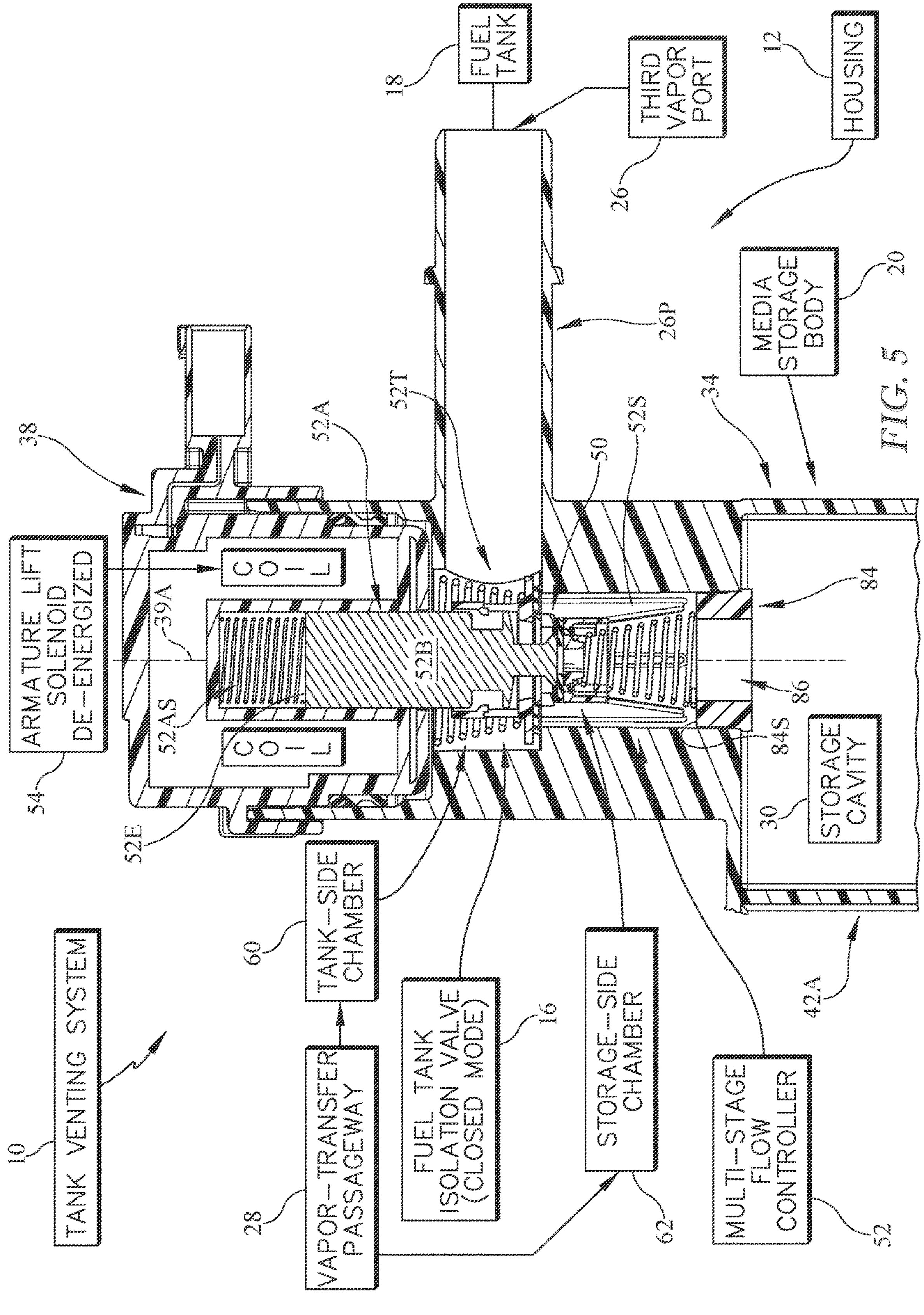
FIG. 5 is an enlarged view taken from the square region of FIG. 4 showing the fuel tank isolation valve in a normally CLOSED mode so as to block pressurized fuel vapor from flowing to or from the fuel tank to the storage cavity of the media storage body.
Figure 12:
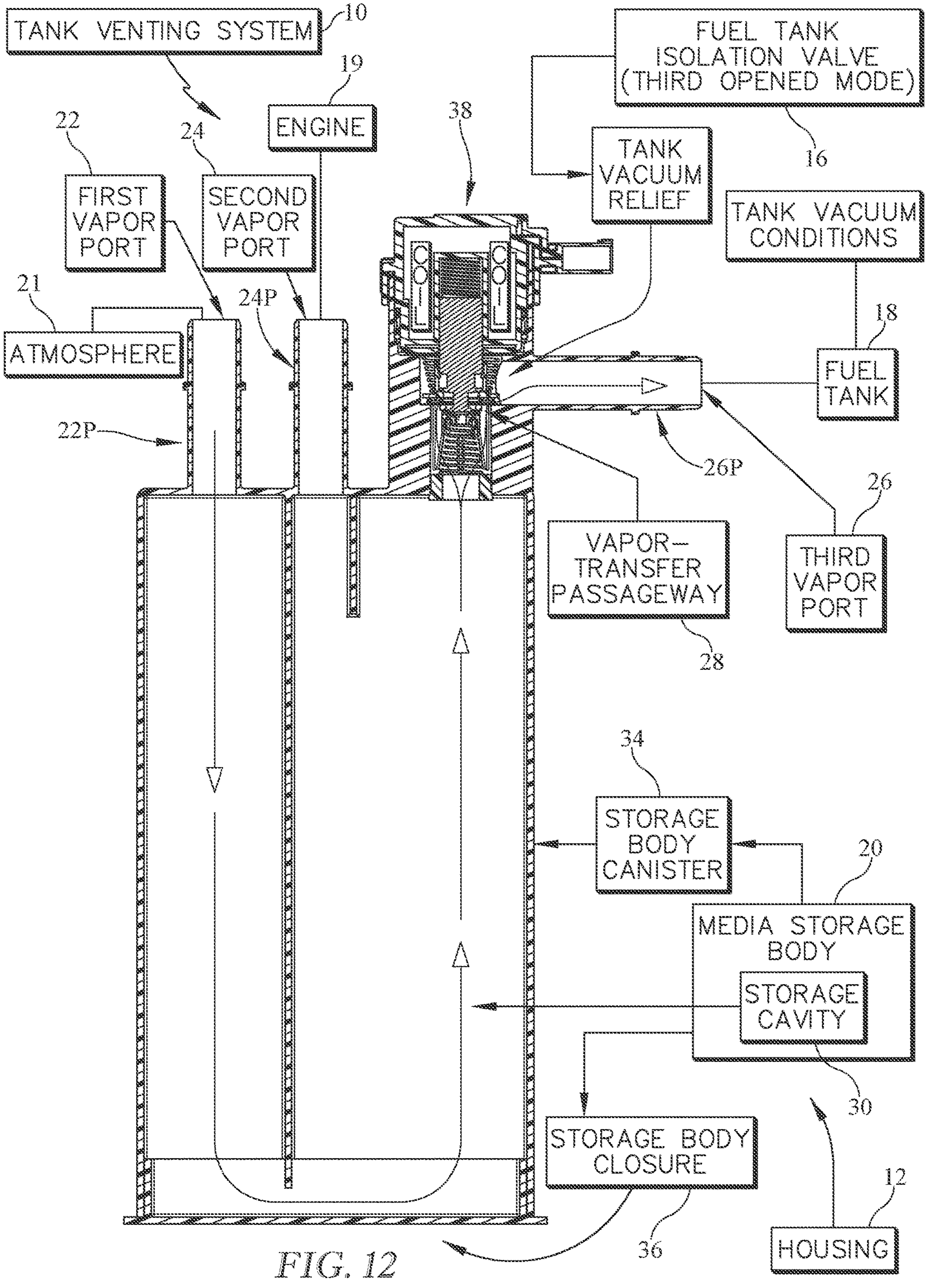
FIG. 12 is a sectional side elevation view similar to FIG. 5 showing the fuel tank isolation valve in a THIRD OPENED mode during development of unwanted vacuum conditions in the fuel tank to draw atmospheric air from the atmosphere port through the media storage body to generate flow of fuel vapor in the media storage body that passes through opened orbital vents located in the vapor-transfer passageway to flow through the fuel tank port into the fuel tank to dissipate unwanted vacuum in the fuel tank.

Media storage body 20 includes a storage body canister 34 and a storage body closure 36 as shown in FIGS. 3, 5, and 12. Storage body canister 34 has an opening 32 that opens into storage cavity 30. Storage body closure 36 couples to storage body canister 34 to close the opening 32 to storage cavity 30.

In the illustrative embodiment, storage body canister 34 of media storage body 20 is formed to define storage cavity 30, plurality of vapor ports 22, 24, 26, and vapor transfer passageway 28. Storage body canister 34 of media storage body 20 is a monolithic component of plastic material, such that storage cavity 30, plurality of vapor ports 22, 24, 26, and vapor transfer passageway 28 are monolithic.

Storage body canister 34 includes an outer canister wall 40, a first flow divider 42A, and a second flow divider 42B as shown in FIGS. 3, 5, and 12. Outer canister wall 40 defines storage cavity 30, while first and second flow dividers 42A, 42B divide storage cavity 30 into different compartments 44, 46, 48. First flow divider 42A extends from outer canister wall 40 into storage cavity 30 between vapor-transfer passageway 28 and second vapor port 24. Second flow divider 42B extends from outer canister wall 40 into storage cavity 30 between second vapor port 24 and first vapor port 22.

A first compartment 44 is formed between outer canister wall 40 and first flow divider 42A, a second compartment 46 is formed between first flow divider 42A and second flow divider 42B, and a third compartment 48 is formed between second flow divider 42B and outer canister wall 40. Vapor-transfer passageway 28 opens into first compartment 44. First vapor port 22 opens into the second compartment 46. Second vapor port 24 opens into third compartment 48.

First flow divider 42A has a first length L1 and second flow divider 42B has a second length L2 as shown in FIG. 5. The second length L2 is greater than the first length L1. In this way, the flow path from vapor-transfer passageway 28 to first vapor port 22 is shorter than the flow path from vapor-transfer passageway 28 to second vapor port 24. Fuel tank isolation valve 16 controls the flow fuel vapor and air between fuel tank 18 and media storage body 20 to the different ports 22, 24, 26 in the housing 12.

In other embodiments, the storage body canister 34 may have a different number of compartments. In some embodiments, the storage body canister 34 may have at least two compartments. In some embodiments, the storage body canister 34 may have more than three compartments with carbon scrubbers, evaporative system integratic modules (ESIM), and/or fresh air filters. The size, shape, and number of compartments of the storage body canister 34 may vary based on the application.

In the illustrative embodiment, storage body canister 34 further includes a first pipe 22P, a second pipe 24P, and a third pipe 26P as shown in FIGS. 1-5. Each of pipes 22P, 24P, 26P defines one of the vapor ports 22, 24, 26. First pipe 22P forms first vapor port 22, second pipe 24P forms second vapor port 24 as shown in FIGS. 1-4, 7, and 12.

Fuel tank isolation valve 16 is shown in a normally CLOSED first mode to block flow of fuel vapor between fuel tank 18 and storage cavity 30 of media storage body 20 in FIGS. 3 and 5-7A. Fuel tank isolation valve 16 is shown in a FIRST OPENED mode to vent some displaced fuel vapor from fuel tank 18 during an early stage of fuel tank refueling when a person uses a fuel-dispersing pump nozzle (not shown) to discharge fuel into a filler neck leading to fuel tank 18 in FIGS. 7, 8, 9, and 9A. Fuel tank isolation valve 16 is shown in a SECOND OPENED mode to vent more displaced fuel vapor from fuel tank 18 during a later stage of fuel tank refueling in FIGS. 10 and 11. Fuel tank isolation valve 16 is shown in a THIRD OPENED mode to alleviate unwanted vacuum conditions in fuel tank 18 in FIGS. 12, 13, and 14. And fuel tank isolation valve 16 is shown in a FOURTH OPENED mode to alleviate unwanted over-pressure conditions in fuel tank 18 in FIGS. 15 and 16.

Fuel tank isolation valve 16 regulates fuel vapor flow through vapor-transfer passageway 28 to regulate pressure of fuel vapor within fuel tank 18 in accordance with predetermined pressure targets as suggested in FIGS. 6, 8, 10, 13, and 15. Fuel tank isolation valve 16 includes a stationary perforated partition plate 50 mounted in vapor-transfer passageway 28 and a multi-stage flow controller 52 that is mounted for movement in vapor-transfer passageway 28 alongside and relative to perforated partition plate 50 to regulate flow of fuel vapor through separate central and orbital vents 56, 58 formed in perforated partition plate 50.

In the illustrative embodiment, the fuel tank isolation valve 16 includes a solenoid 54 for use with multi-stage flow controller 52 as suggested in FIG. 1. The solenoid 54 may be used to control the multi-stage flow controller 52 during tank refueling activities. Solenoid 54 can be energized during the FIRST and SECOND OPENED modes of fuel tank isolation valve 16 as suggested in FIGS. 6 and 8. In some embodiments, the multi-stage flow controller 52 of the fuel tank isolation valve may be mechanically activated using a suitable mechanical system using vacuum and pressure to control movement of the controller 52.

Figure 4:
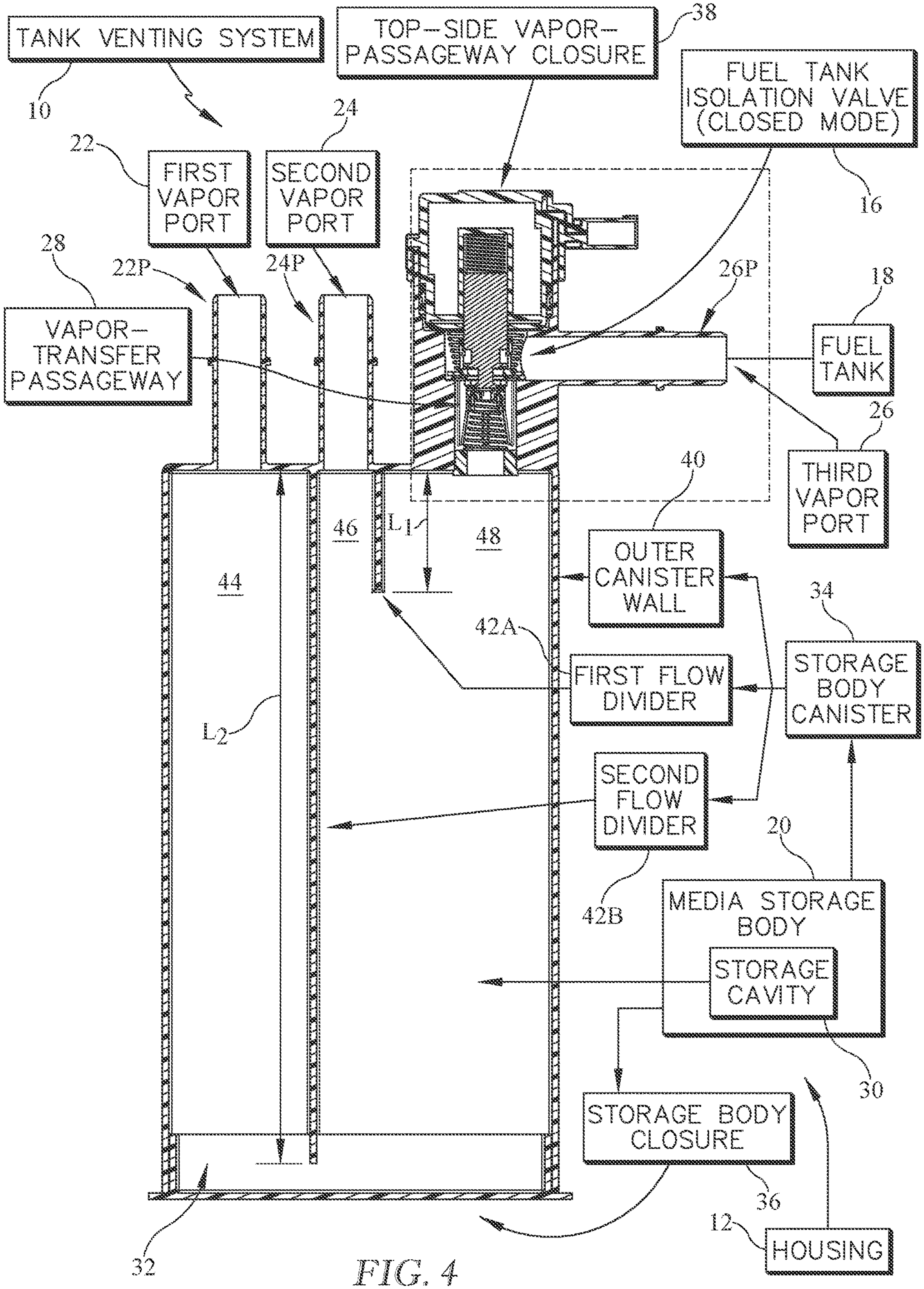
FIG. 4 is a sectional side elevation view of the tank venting system of FIG. 1 taken showing the media storage body includes storage body canister having an outer canister wall that defines the portion of the storage cavity, a first flow divider that extends from the outer canister wall into the storage cavity between the vapor-transfer passageway and an atmosphere port included in the plurality of vapor ports, and a second flow divider that extends from the outer canister wall into the storage cavity between the atmosphere port and an engine port included in the plurality of vapor ports.

Perforated partition plate 50 of fuel tank isolation valve 16 is located in vapor-transfer passageway 28 formed in housing 12 as shown in FIGS. 3 and 4. Perforated partition plate 50 partitions vapor-transfer passageway 28 to define a tank-side chamber 60 above perforated partition plate 50 for conducting fuel vapor between the third vapor port 26 and the center and orbital vents 56, 58 formed in perforated partition plate 50 and a storage-side chamber 62 below perforated partition plate 50 for conducting fuel vapor between the storage cavity 30 of media storage body 20 and the center and orbital vents 56, 58.

Figure 6A:
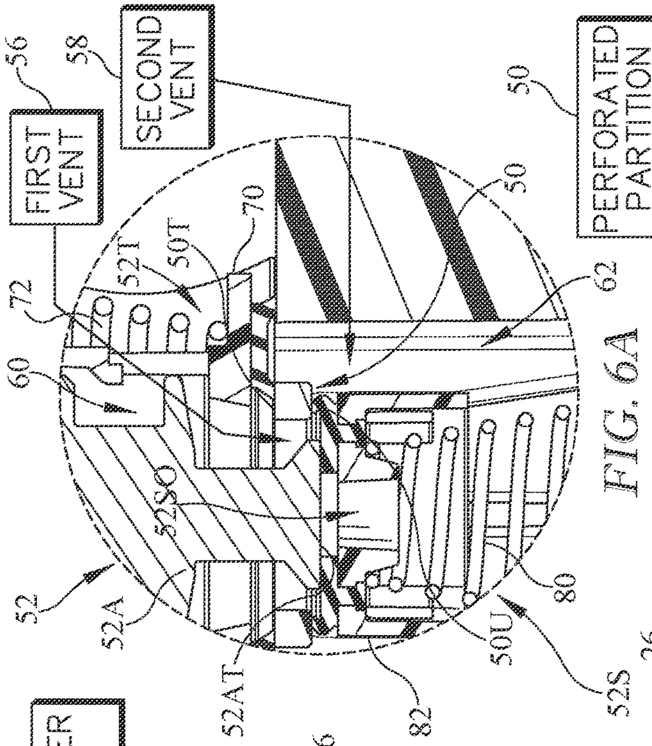
FIG. 6A is an enlarged view taken from the circled region of FIG. 6 showing the normal closure of the center and orbital vents formed in the stationary perforated partition plate in the normally CLOSED mode of the fuel tank isolation valve.
Figure 6B:
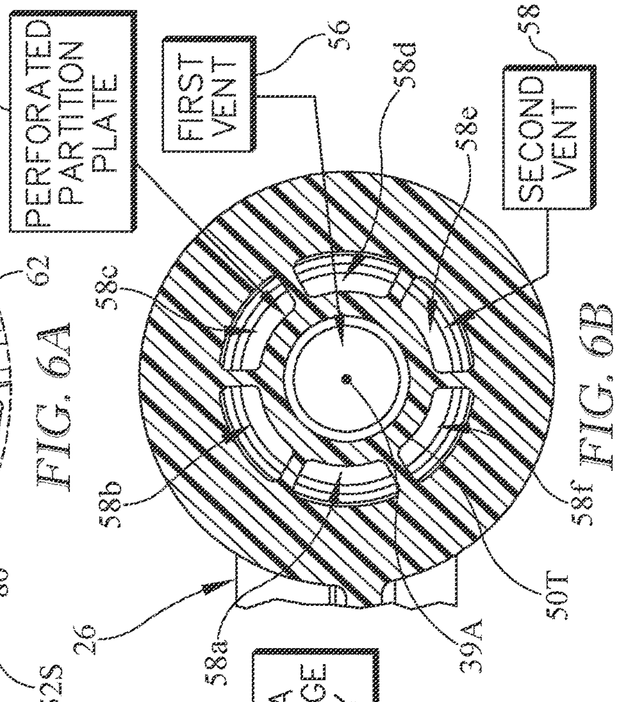
FIG. 6B is an enlarged sectional view taken along line 6B-6B of FIG. 6 showing that the stationary perforated partition plate is formed to include a large-diameter central vent aperture establishing the first vent and six relatively smaller oblong arc-shaped orbital vent apertures surrounding the central vent aperture and establishing the second vent.
Figure 6:
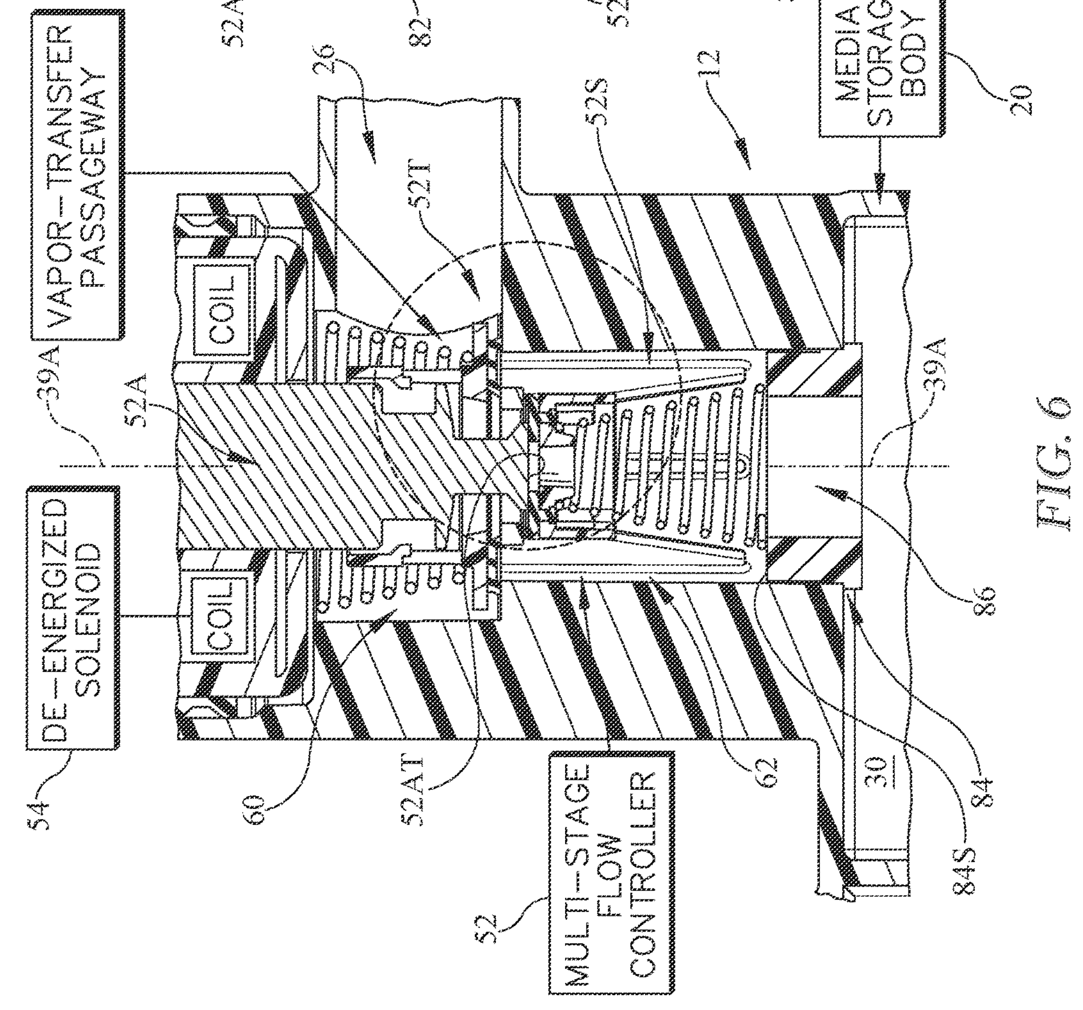
FIG. 6 is detail view of FIG. 5 showing the storage-side vapor-flow regulator and movable armature cooperate to close a center vent formed in the perforated partition plate and the tank-side vapor-flow regulator closes orbital vents surrounding the center vent formed in the perforated partition plate when the fuel tank isolation valve is in the normally CLOSED mode.

Multi-stage flow controller 52 is configured as shown in FIGS. 3, 5, and 6 normally to engage perforated partition plate 50 to close the first and second vents 56, 58 formed in perforated partition plate 50 so as to block fuel vapor flow from third vapor port 26 to storage cavity 30 through the vapor-transfer passageway 28 formed housing 12 so that fuel tank 18 is normally isolated from fluid communication with storage cavity 30 of media storage body 20. However, multi-stage flow controller 52 is configured in accordance with the present disclosure to disengage from perforated partition plate 50 in several different ways as shown in FIGS. 6, 8, 10, and 12 to regulate flow of fuel vapor in vapor-transfer passageway 28 between fuel tank 18 and storage cavity 30 of media storage body 20 independently through a central vent aperture 56 formed in perforated partition plate 50 to establish first vent 56 and also through several orbital vent apertures 58*a-f* (see FIG. 6B) formed in perforated partition plate 50 to establish second vent 58 and surround central vent aperture 56 during (1) early and later stages of fuel tank 18 refueling activity shown in FIGS. 6 and 8, (2) development of unwanted vacuum conditions in fuel tank 18 shown in FIG. 13, and (3) development of unwanted over-pressure conditions in fuel tank 18 shown in FIG. 15.

Multi-stage flow controller 52 includes a tank-side vapor-flow regulator 52T and a storage-side vapor-flow regulator 52S as suggested in FIGS. 3 and 4. Tank-side vapor-flow regulator 52T is located above perforated partition plate 50 in tank-side chamber 60 that is formed in the vapor-transfer passageway 28 as suggested in FIGS. 3 and 4 to communicate fuel vapor to and from fuel tank 18 via third vapor port 26 coupled to fuel tank 18. Storage-side vapor-flow regulator 52S is located under perforated partition plate 50 in the storage-side chamber 62 that is formed in vapor-transfer passageway 28 to communicate fuel vapor to and from storage cavity 30 of media storage body 20. Each of tank-side and storage-side vapor-flow regulators 52T, 52S is aligned to move upwardly and downwardly relative to perforated partition plate 50 along a single vertical axis 39A that extends through the vapor-transfer passageway 28.

In the illustrative embodiment, first and second pipes 22P, 24P extend from outer canister wall 40 of storage body canister 34 parallel to vertical axis 39A. Third pipe 26P extends radially relative to vertical axis 39A.

Multi-stage flow controller 52 also includes a spring-biased movable armature 52A that is operationally coupled to solenoid 54 and is arranged to extend into the vapor-transfer passageway 28 as shown in FIGS. 3 and 6 and move relative to the stationary perforated partition plate 50 along the single vertical axis 39A that extends through the tank-side chamber 60, the central vent aperture 56 formed in perforated partition plate 50, and the storage-side chamber 62. Movable armature 52A cooperates with tank-side and storage-side vapor-flow regulators 52T, 52S when fuel tank isolation valve 16 is in a normal CLOSED mode as shown in FIGS. 2, 4, 5, 6, and 6A to block flow of fuel vapor through the central and orbital vent apertures 56, 58 formed in perforated partition plate 50 so that fuel vapor cannot flow through the vapor-transfer passageway 28 between fuel tank 18 and storage cavity 30 of media storage body 20 and therefore fuel tank 18 normally is isolated from the media storage body 20.

Tank-side and storage-side vapor-flow regulators 52T, 52S are configured to move in the vapor-transfer passageway 28 relative to the stationary perforated partition plate 50 to close, partly open, and open vents 56, 58 formed in perforated partition plate 50 in response to changes in pressure of fuel vapor extant in the vapor-transfer passageway 28 and in fuel tank 18. Movable armature 52A is spring-biased by spring 52AS normally to move toward storage-side vapor-flow regulator 52S and is operationally linked to solenoid 54 to move upwardly away from storage-side vapor-flow regulator 52S when solenoid 54 is energized. Movable armature 52A includes a distal tip 52AT that is arranged to extend into the vapor-transfer passageway 28 and move therein in response to a pushing force generated by an armature-biasing spring 52AS and actuation of solenoid 54 to assume various positions therein to cooperate with storage-side vapor-flow regulator 52S so as to close or partly open the central vent 56 formed in the perforated partition plate 50.

A normally CLOSED mode of fuel tank isolation valve 16 is established as shown in FIGS. 2, 4, 5, 6, and 6A when tank-side vapor-flow regulator 52T engages a topside 50T of perforated partition plate 50 to close second vent 58 and distal tip 52AT of movable armature closes a vapor-flow orifice formed 52SO in storage-side vapor-flow regulator 52S while storage-side vapor-flow regulator 52S engages an underside 50U of perforated partition plate 50. As suggested in FIGS. 3 and 4, solenoid 54 is de-energized in the normally CLOSED mode while armature-biasing spring 52AS is arranged to engage a top end of movable armature 52A and act against top-side vapor-transfer passageway closure 38 to yieldably move movable armature 52A downwardly to cause distal tip 52AT to engage storage-side vapor-flow regulator 52S and close the vapor-flow orifice 52SO formed in storage-side vapor-flow regulator 52S.

Figure 7:
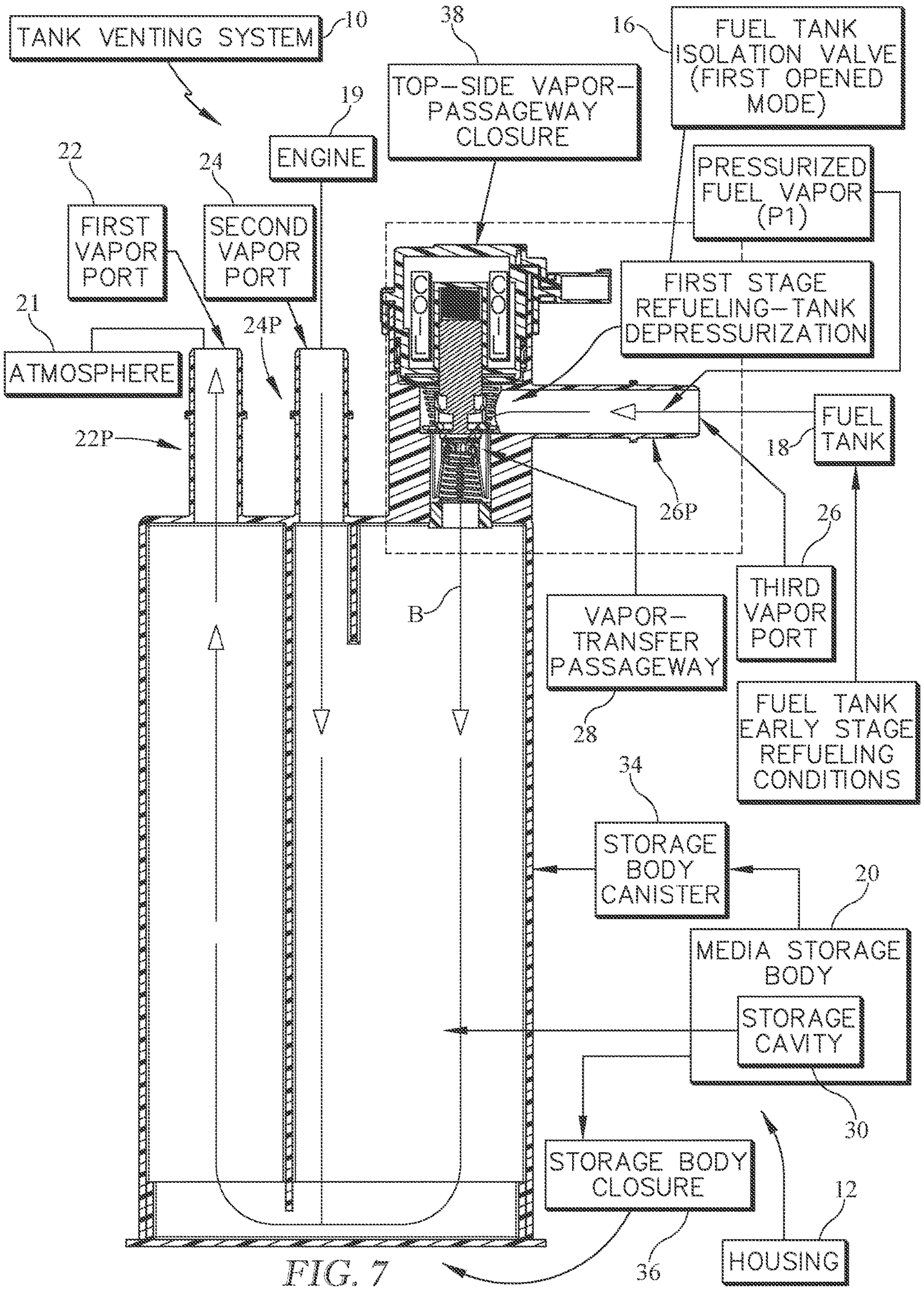
FIG. 7 is a sectional side elevation view similar to FIG. 4 showing the fuel tank isolation valve in a FIRST OPENED mode during an early stage of fuel tank refueling to allow a BLEED stream of pressurized fuel vapor to flow from the fuel tank into the storage cavity of the media storage body through a FIRST partly opened center vent formed in the perforated partition plate during the early stage of refueling the fuel tank.
Figure 8:
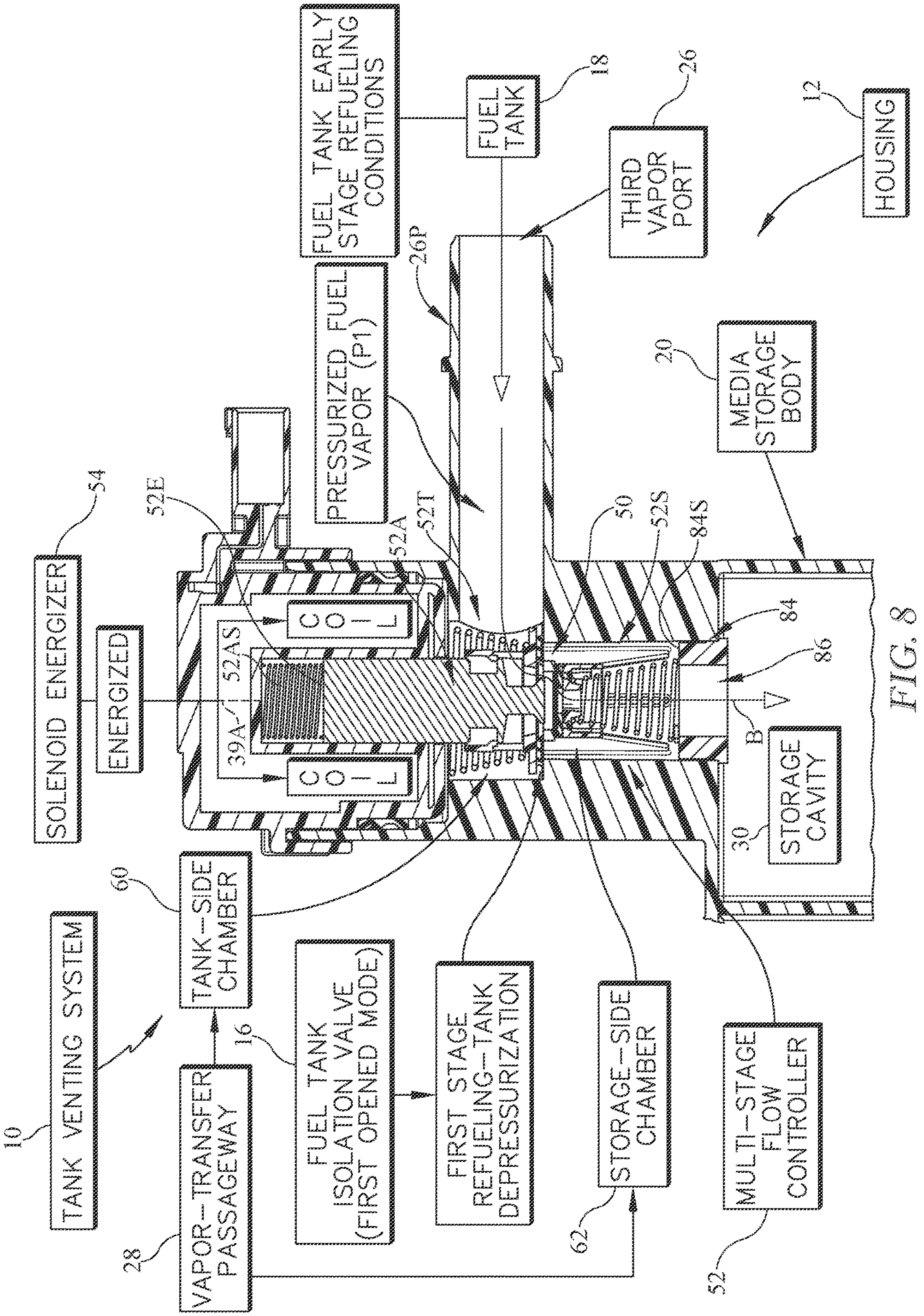
FIG. 8 is an enlarged view taken from the square region of FIG. 7 showing the fuel tank isolation valve in the FIRST OPENED mode during an early stage of fuel tank refueling to allow a BLEED stream of pressurized fuel vapor to flow from the fuel tank into the storage cavity of the media storage body through a FIRST partly opened first vent formed in the stationary perforated partition plate during the early stage of refueling the fuel tank.
Figures 9, 9A:
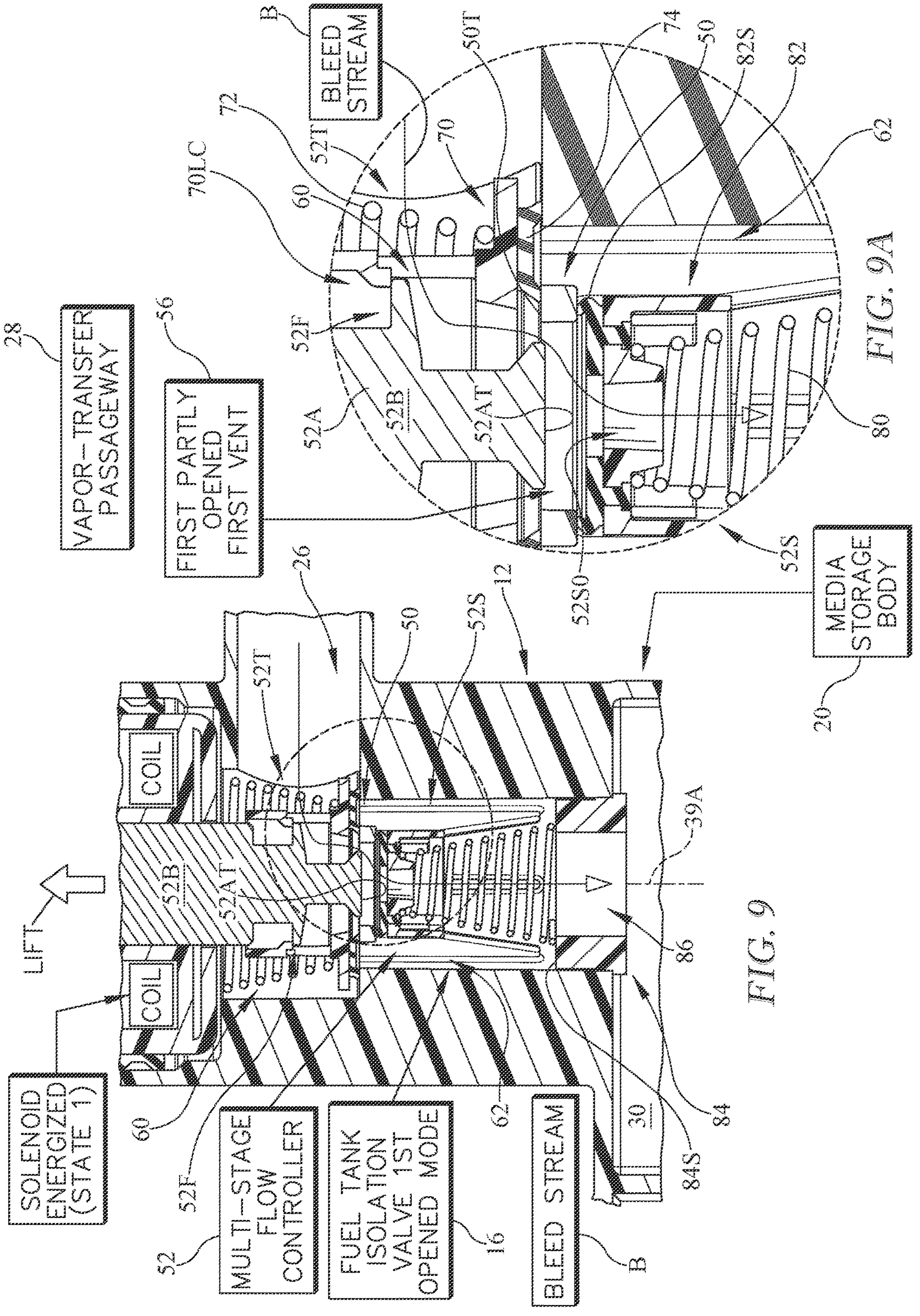
FIG. 9 is detail view of FIG. 8 showing a first partial opening of the center vent.
FIG. 9A is an enlarged view taken from the circled region of FIG. 9 showing flow of the BLEED stream of pressurized fuel vapor through the FIRST partly opened center vent around the distal tip of the movable armature while the storage-side vapor-flow regulator remains engaged to an underside of the perforated partition plate to align a vapor-flow orifice formed in the storage-side vapor-flow regulator with the central vent formed in the perforated partition plate.

A FIRST OPENED mode of fuel tank isolation valve 16 is established during an early stage of fuel tank refueling as shown in FIGS. 7, 7, 8, 9, and 9A when solenoid 54 is energized to lift distal tip 52AT of movable armature 52A upwardly to disengage storage-side vapor-flow regulator 52S so as to open vapor-flow orifice 52SO while tank-side vapor-flow regulator 52T remains engaged to topside 50T of perforated partition plate 50 and the storage-side vapor-flow regulator 52S remains engaged to underside 50U of perforated partition plate 50 so that a BLEED stream (B) of pressurized fuel vapor can flow from the third vapor port 26 through the vapor-transfer passageway 28 through the narrowly opened first vent 56 in its FIRST partly opened state as shown in FIG. 9A. This allows displaced fuel vapor to begin to flow from fuel tank 18 to storage cavity 30 of media storage body 20 through vapor-transfer passageway 28.

A SECOND OPENED mode of fuel tank isolation valve 16 is established during a later stage of fuel tank refueling as suggested in FIGS. 10 and 11 when solenoid 54 is further energized to lift tank-side vapor-flow regulator 52T upwardly away from perforated partition plate 50 to open second vent 58 and to move distal tip 52AT of movable armature 52A out of first vent 56 to a position above and away from topside 50T of perforated partition plate 50 to further open first vent 56 so as to change first vent 56 to its SECOND partly opened state shown in FIG. 11 so that a relatively greater DISCHARGE stream (D) of pressurized fuel vapor can flow from the third vapor port 26 through the vapor-transfer passageway 28 through the opened second vent 58 and the more widely opened first vent 56. Movable armature 52A includes an elongated body 52B that extends between top end and distal tip 52AT and a radially outwardly extending lift flange 52F cantilevered to elongated body 52B as suggested in FIGS. 8 and 10.

Figure 10:
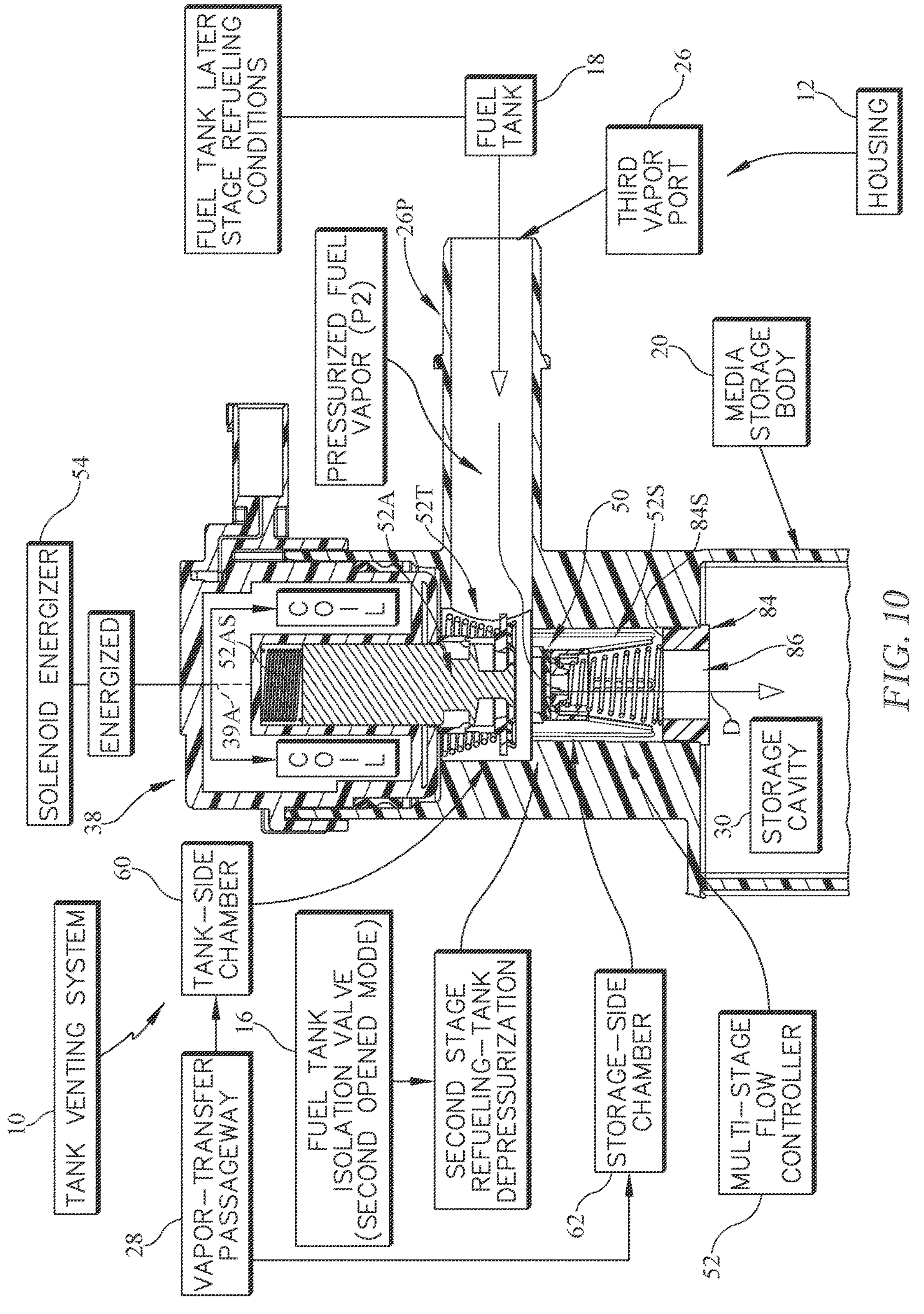
FIG. 10 is a view similar to FIGS. 6 and 8 showing the fuel tank isolation valve in a SECOND OPENED mode during a later stage of fuel tank refueling to allow a relatively larger DISCHARGE stream of pressurized fuel vapor to flow from the fuel tank into the storage cavity of the media storage body through a SECOND partly opened central vent and opened orbital vents owing to upward movement of the tank-side vapor-flow regulator to disengage the topside of the perforated partition plate during the later stage of refueling the fuel tank.

Tank-side vapor-flow regulator 52T is formed to include a radially inwardly extending lift catch 70LC as also shown in FIGS. 8 and 10. When solenoid 54 is energized, movable armature 52A is moved upwardly along central vertical axis 39A to compress armature-biasing spring 52AS between a top-side vapor-transfer passageway closure 38 and top end 52E of movable armature 52A owing to application of a lifting force applied by the upwardly moving lift flange 52F of movable armature 52A to the underside of lift catch 70LC of tank-side vapor-flow regulator 52T as suggested in FIGS. 10 and 11. This lift force moves tank-side vapor-flow regulator 52T upwardly to open second vent 58 and to move distal tip 52AT of movable armature 52A further away from perforated partition plate 50 to establish the SECOND partly opened state of first vent 56 as shown in FIG. 11.

In the normally CLOSED mode, no part of movable armature 52A touches or engages regulator 52T to close orbital vent apertures 56, 58 of partition plate 50. Rather spring 72 biases regulator 52T into engagement with topside 50T of partition plate 50. Regulator 52T has openings so that lift flange 52F of movable armature 52A does not engage any part of tank-side vapor-flow regulator 52T. It is only when valve 16 is in second opened mode does movable armature 52A engage radially inwardly extending lift catch 70LC of regulator 52T to compress spring 72 and open orbital vent apertures 56, 58.

Figure 13:
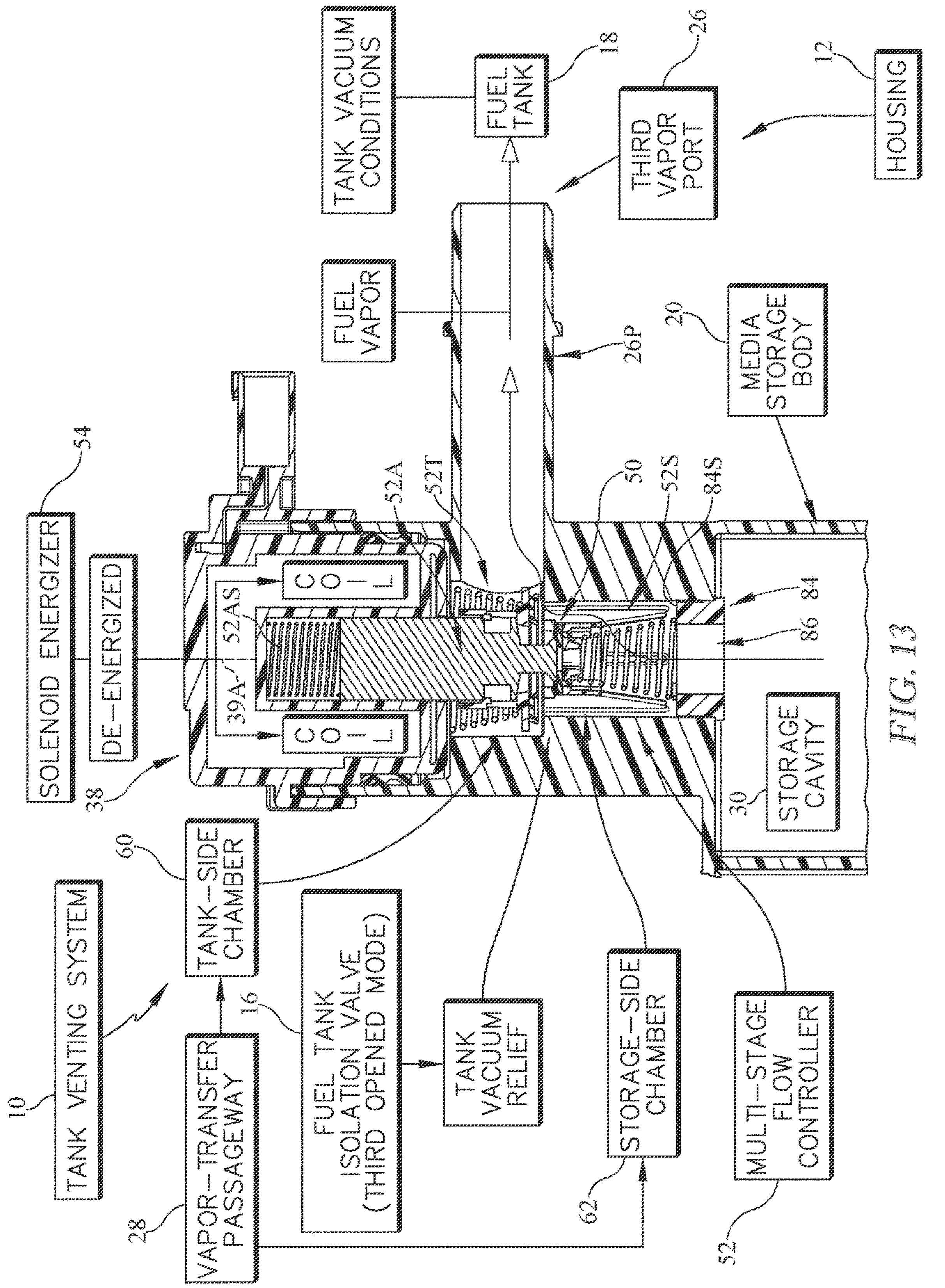
FIG. 13 is an enlarged view taken from the square region of FIG. 12 showing that when the fuel tank isolation valve is in the THIRD OPENED mode the orbital vents are opened while the center vent is closed.
Figure 14:
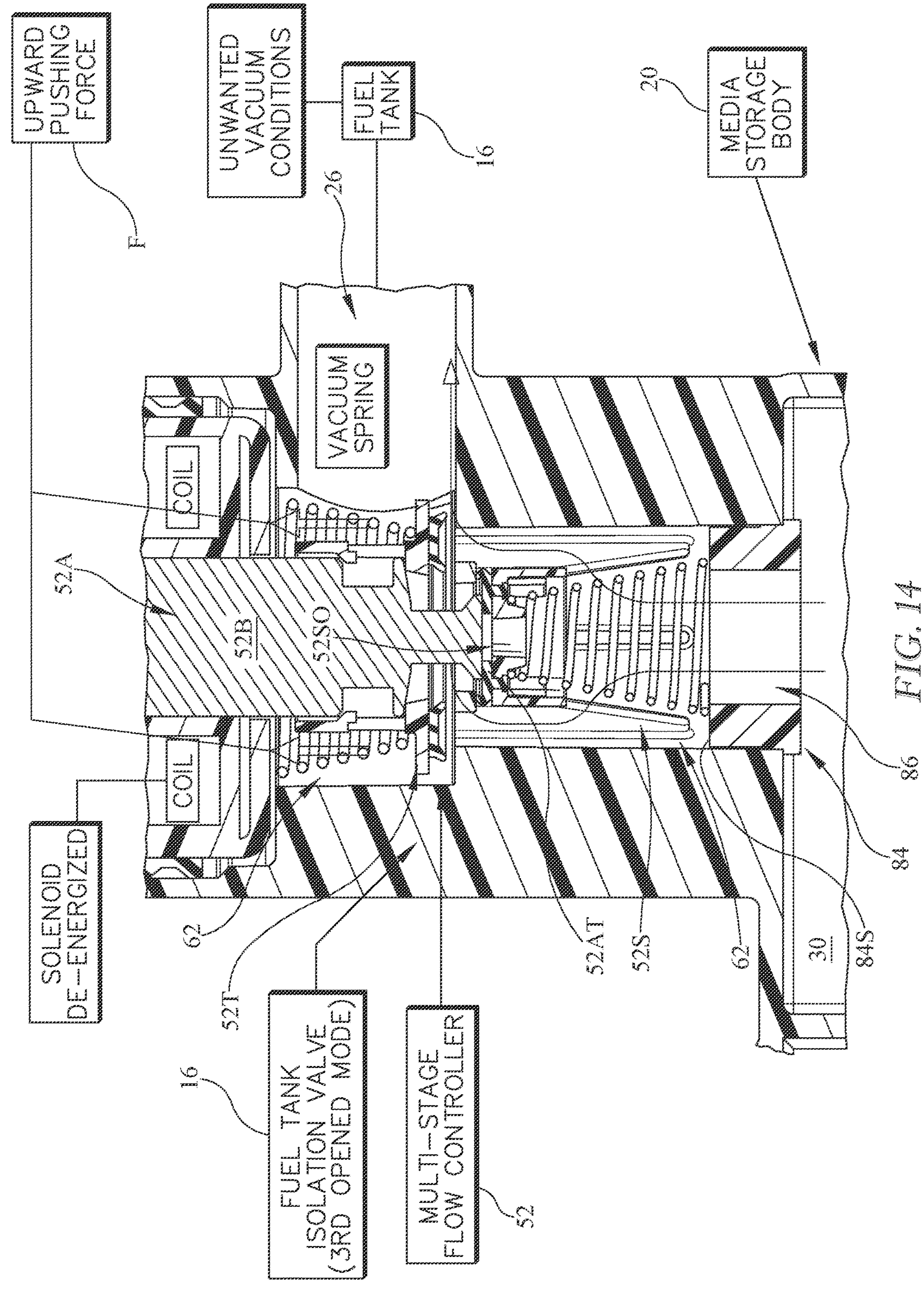
FIG. 14 is a detail view of FIG. 13 when the fuel tank isolation valve is in the THIRD OPENED mode.

A THIRD OPENED mode of fuel tank isolation valve 16 is established as shown in FIGS. 12, 13, and 14 to conduct fuel vapor from storage cavity 30 of media storage body 20 through the vapor-transfer passageway 28 into fuel tank 18 to alleviate any unwanted vacuum conditions that develop in fuel tank 18. In this THIRD OPENED mode, relatively high fuel vapor pressure extant in the storage-side chamber 62 acts on tank-side vapor-flow regulator 52T through second vent 58 to apply an upward pushing force to the underside of tank-side vapor-flow regulator 52T so as to move tank-side vapor-flow regulator 52T upwardly in the tank-side chamber 60 to disengage topside 50T of perforated partition plate 50 to open second vent 58 while solenoid 54 is de-energized to allow the armature-biasing spring 52AS associated with movable armature 52A to move the movable armature 52A downwardly to extend distal tip 52AT into first vent 56 to close the vapor-restriction orifice 52SO formed in storage-side vapor-flow regulator 52S while that storage-side vapor-flow regulator 52S engages underside 50U of perforated partition plate 50.

Figure 15:
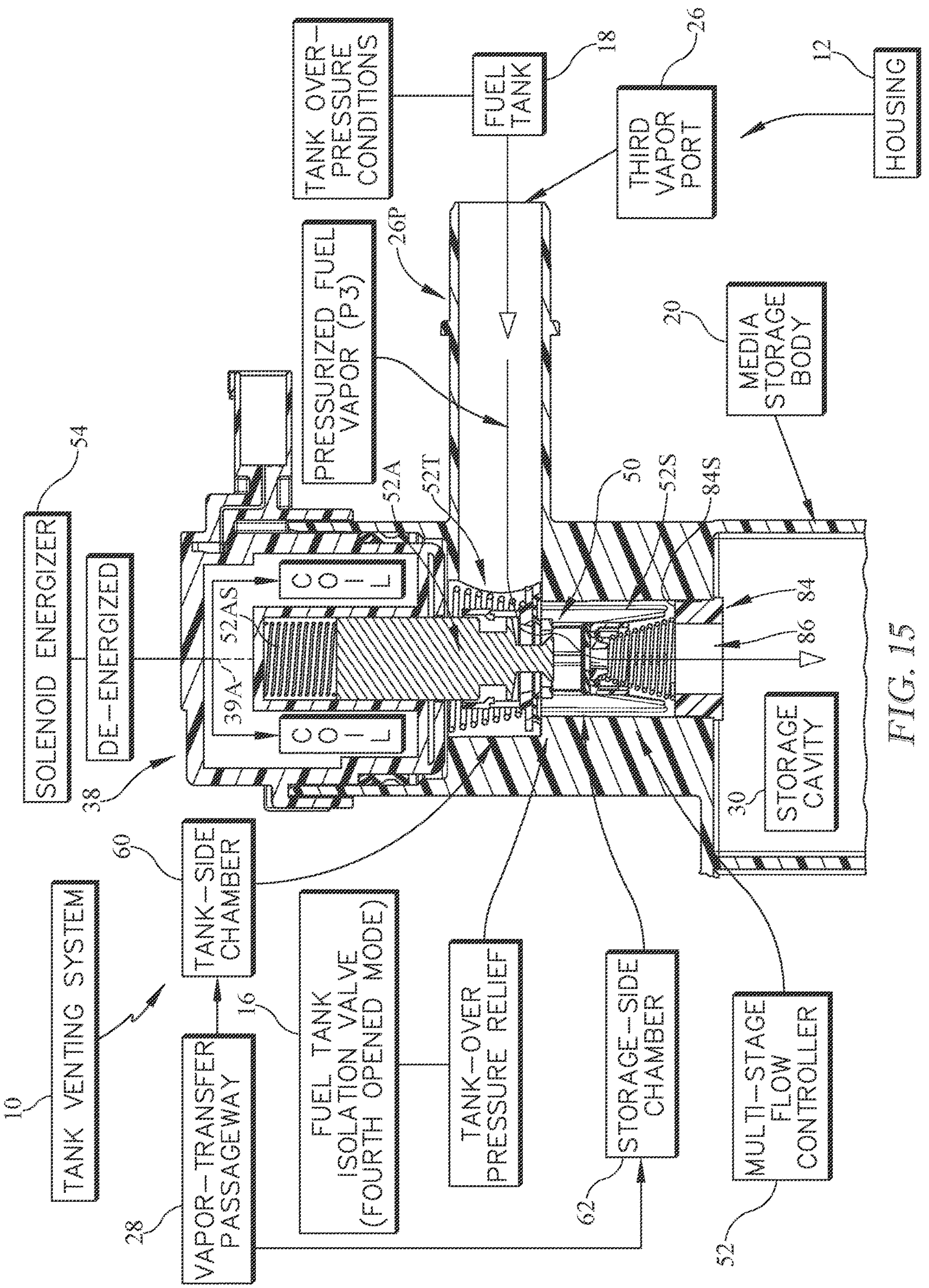
FIG. 15 is a sectional view similar to FIGS. 6, 8, 10, and 13 showing the fuel tank isolation valve in a FOURTH OPENED mode during development of unwanted over-pressure conditions in the fuel tank to cause pressurized fuel vapor to flow from the fuel tank port into the storage cavity of the media storage body through a THIRD partly opened center vent formed in the perforated partition plate.
Figure 16:
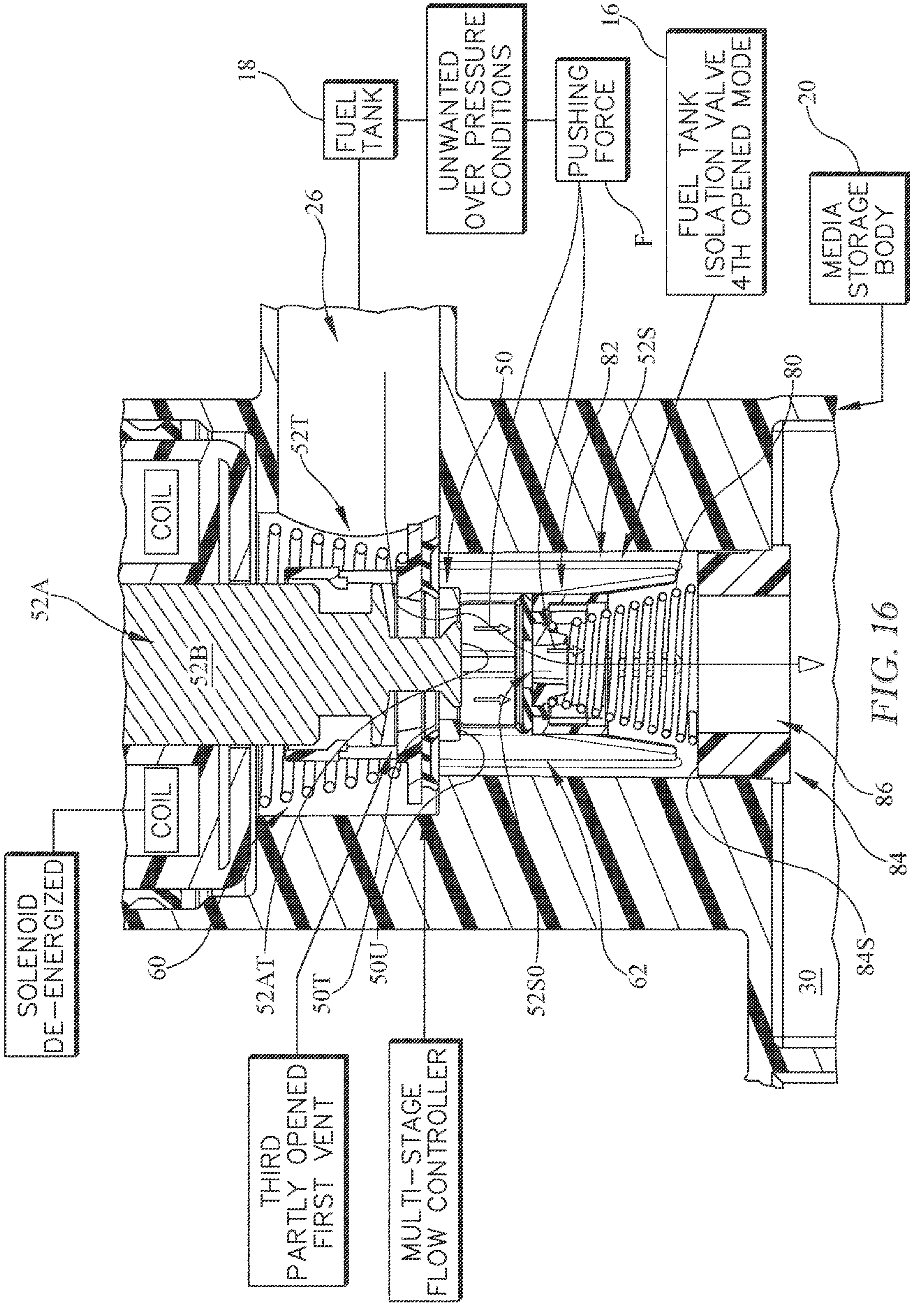
FIG. 16 is a detail view of FIG. 15 when the fuel tank isolation valve is in the FOURTH OPENED mode.

A FOURTH OPENED mode of fuel tank isolation valve 16 is established as shown in FIGS. 15 and 16 to conduct pressurized fuel vapor from fuel tank 18 to storage cavity 30 of media storage body 20 through the vapor-transfer passageway 28 to alleviate over-pressure conditions that develop in fuel tank 18. In this FOURTH OPENED mode, relatively high fuel vapor pressure extant in the tank-side chamber 60 acts on storage-side vapor-flow regulator 52S through the partly opened first vent 56 to move storage-side vapor-flow regulator 52S downwardly away from underside 50U of perforated partition plate 50 to enlarge the opening in first vent 56 to assume a THIRD partly opened state as shown in FIG. 16 while tank-side vapor-flow regulator 52T remains engaged to topside 50T of perforated partition plate 50.

As mentioned above, fuel tank isolation valve 16 may be important to regulate the pressure of fuel vapor in the system of hybrid vehicles. Fuel tank isolation valve 16 is normally closed to block the flow of fuel vapor from tank 18 to media storage body 20 as shown in FIG. 6. Fuel tank isolation valve 16 has four different open modes (the first opened mode as shown in FIG. 6, the second opened mode as shown in FIG. 8, the third opened mode as shown in FIG. 10, and the fourth opened mode as shown in FIG. 13) to regulate the flow of fuel vapor between fuel tank 18 and media storage body 20 based on different conditions of the system.

In the case of over-pressure conditions, valve 16 changes to the fourth mode to allow a release a large amount of pressure from fuel tank 18. Conversely, if there is vacuum conditions in fuel tank 18, fuel tank isolation valve 16 may change to third opened mode to alleviate unwanted vacuum conditions. Once the vehicle switches to using engine 19, fuel tank isolation valve 16 may change to one of first opened mode, second opened mode, and fourth opened mode to allow the fuel vapor to flow from fuel tank 18 through media storage body 20 and to the engine 19 to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 16 changes from closed mode to first opened mode to vent some displaced fuel vapor from fuel tank 18. After refueling begins and fuel is being discharged at a constant rate into fuel tank 18, fuel tank isolation valve 16 changes to second opened mode to vent more displaced fuel vapor.

A sectional perspective view of tank venting system 10 is provided in FIG. 3 to show that vapor-transfer passageway 28 formed in housing 12 is arranged to interconnect fuel tank 18 and storage cavity 30 of media storage body 20 in fluid communication and that fuel tank isolation valve 16 is located inside vapor-transfer passageway 28 formed in housing 12. Fuel tank isolation valve 16 is operable in accordance with the present disclosure to manage vapor flow between fuel tank 18 and media storage body 20 through vapor-transfer passageway 28 during four OPENED modes of operation.

Housing 12 comprises a media storage body 20 formed to define storage cavity 30; plurality of vapor ports 22, 24, 26 including first vapor port 22 in fluid communication with atmosphere 21 surrounding system 10, second vapor port 24 in fluid communication with engine 19, and third vapor port 26 in fluid communication with fuel tank 18; and vapor-transfer passageway 28 arranged to interconnect storage cavity 30 of media storage body 20 and fuel tank port 26 associated with fuel tank 18 in fluid communication so that pressurized fuel vapor can flow back and forth between fuel tank 18 and media storage body 20.

Media storage body 20 of housing 12 comprises storage body canister 34 that defines a portion of storage cavity 30, a storage body closure 36 that closes the storage cavity 30 form a bottom of the canister 34, and a top-side vapor-transfer passageway closure 38 that closes the vapor-transfer passageway 28 as shown in FIGS. 3 and 4. Storage body canister 34 has an opening 32 that opens into storage cavity 30. Storage body closure 36 couples to storage body canister 34 to close the opening 32 to storage cavity 30 from the bottom of the storage body canister 34. Top-side vapor-transfer passageway closure 38 couples to storage body canister 34 to close vapor-transfer passageway 28 from a top of the storage body canister 34.

Fuel tank isolation valve 16 comprises a perforated partition plate 50 that is arranged to divide vapor-transfer passageway 28 into a storage-side chamber 62 that communicates with storage cavity 30 of media storage body 20 and an overlying tank-side chamber 60 that communicates with third vapor port 26 suggested in FIGS. 3 and 4. Perforated partition plate 50 is formed to include a central vent aperture 56 to establish first vent 56 and six orbital vent apertures 58*a-f* establishing second vent 58 and surrounding central vent aperture 56 as shown in FIG. 3.

Fuel tank isolation valve 16 further comprise an armature-biasing solenoid 54 mounted in the tank-side chamber 60 as shown in FIG. 6, and a multi-stage flow controller 52. Multi-stage flow controller 52 includes a movable armature 52A that is arranged normally in a CLOSED mode of the fuel tank isolation valve 16 as shown in FIGS. 2, 4, 5, 6, and 6A to block flow of fuel vapor through the central and orbital vent apertures 56, 58 formed in perforated partition plate 50 included in fuel tank isolation valve 16 so that storage cavity 30 is normally isolated from fuel tank 18 until either (1) a tank refueling activity begins as suggested in FIG. 8; (2) tank vacuum exceeds a predetermined vacuum level as suggested in FIG. 10; or (3) tank pressure exceeds a predetermined pressure level as suggested in FIG. 13.

Perforated partition plate 50 is shown in FIG. 2 and arranged to divide vapor-transfer passageway 28 of the housing 12 into an upper tank-side chamber 60 and a lower storage-side chamber 62 as suggested in FIG. 2. Perforated partition plate 50 is formed to include a round central vent aperture 56 centered on central vertical axis 39A and six arc-shaped orbital vent apertures 58*a-f* arranged to surround the round central vent aperture 56 and lie in radially spaced relation from central vertical axis 39A and circumferentially spaced-apart relation to one another. Perforated partition plate 50 is mounted in a stationary position in the vapor-transfer passageway 28 of housing 12.

As suggested in FIG. 3, fuel tank isolation valve 16 comprises a perforated partition plate 50, an armature-biasing solenoid 54, and a multi-stage flow controller 52 including a tank-side vapor-flow regulator 52T comprising a top hat-shaped spring cap 70 and a large-diameter compression (vacuum) spring 72; an armature-biasing spring 52AS; a movable armature 52A; and a storage-side vapor-flow regulator 52S comprising a narrow-diameter compression (pressure) spring 80, a spring cap 82, and a bottom mount member 84.

Bottom mount member 84 is independent of housing 12. Bottom mount member 84 is located in an opening of vapor-transfer passageway 28 that opens directly into storage cavity 30 to provide a shoulder surface 84S. Shoulder surface 84S is engaged by other components of fuel tank isolation valve 16 to retain fuel tank isolation valve 16 in the opening of vapor-transfer passageway 28.

Bottom mount member 84 is located in the vapor-transfer passageway 28 below the compression spring 80 and spring cap 82 so that the spring 80 engages with the bottom mount member 84 to bias the spring cap 82 with the O-ring seal 82S into engagement with the underside 50U of perforated partition plate 50. The bottom mount member 84 is shaped to include a hole 86 that opens into storage cavity 30 and vapor-transfer passageway 28 so as to allow pressurized fuel vapor to flow through bottom mount member 84. In some embodiments, bottom mount member 84 may be fixed to housing 12 in vapor-transfer passageway 28 of housing 12.

As suggested in FIG. 5, fuel tank isolation valve 16 is in its normally CLOSED mode to block flow of fuel vapor through vapor-transfer passageway 28 of housing 12 between fuel tank 18 and media storage body 20. Tank-side vapor-flow regulator 52T and storage-side vapor-flow regulator 52S have been installed in vapor-transfer passageway 28 of housing 12 to lie in alignment with one another along single vertical axis 39A that extends through the center of perforated partition plate 50 to cooperate with perforated partition plate 50 to establish a fuel tank isolation valve 16 in accordance with the present disclosure that functions normally to block all flow of fuel vapor between fuel tank 18 and media storage body 20.

As suggested in FIG. 5, movable armature 52A, spring 52AS, and tank-side vapor-flow regulator 52T included in fuel tank isolation valve 16 have been installed in the tank-side chamber 60 of the vapor-transfer passageway 28, while storage-side vapor-flow regular 52S has been installed in the storage-side chamber 62. Movable armature 52A, spring 52AS, and tank-side vapor-flow regulator 52T are installed in tank-side chamber 60 of the vapor-transfer passageway 28 through an opening in housing 12. Top-side vapor-transfer passageway closure 38 is then attached to housing 12 to close tank-side chamber 60 of vapor-transfer passageway 28.

The installation of movable armature 52A, spring 52AS, and tank-side vapor-flow regulator 52T causes a downwardly extending tip 52AT of movable armature 52A to extend along the single vertical axis 39A into the first vent 56 established by central vent aperture 56 and formed in perforated partition plate 50. The installation of movable armature 52A, spring 52AS, and tank-side vapor-flow regulator 52T also causes seal ring 74 of tank-side vapor-flow regulator 52T to engage an annular outer perimeter region of topside 50T of perforated partition plate 50 to block fuel vapor from passing through the second vent 58 established by six orbital vent apertures 58*a-f* (see FIG. 6B) surrounding the central vent aperture 58. Second vent 58 is established by an inner rim of O-ring seal 82S of storage-side vapor-flow regulator 52S that engages a downwardly facing surface on distal tip 52AT of movable armature 52A and an outer rim of O-ring seal 82S of storage-side vapor-flow regulator 52S that engages a downwardly facing surface on the annular inner perimeter region of underside 50U of perforated partition plate 50 that surrounds the central vent aperture 56 to block fuel vapor from passing through the central vent aperture 56 formed in perforated partition plate 50. The round central vent aperture 56 and the six surrounding circumferentially spaced-apart arcuate orbital vent apertures 58*a-f* formed in perforated partition plate 50 of fuel tank isolation valve 16 are shown for example in FIG. 6B.

Storage-side vapor-flow regular 52S is installed through the opening of storage body canister 34. Spring cap 82 and spring 80 are inserted into the storage-side chamber 62 and bottom mount member 84 is then inserted and fixed to housing 12. The installation of storage-side vapor-flow regular 52S causes O-ring seal 82S of storage-side vapor-flow regulator 52S to engage the downwardly facing surface on distal tip 52AT of movable armature 52A and the downwardly facing surface on the annular inner perimeter region of underside 50U of perforated partition plate 50 that surrounds the central vent aperture 56. Then storage body closure 36 is coupled to the bottom opening of the storage body canister 34 to close off storage cavity 30.

A FIRST STAGE of a refueling depressurization of fuel tank 18 takes place when fuel tank isolation valve 16 is in the FIRST OPENED mode as suggested in FIGS. 7, 8, 9, 9A during use of a fuel-dispensing pump nozzle by an operator (not shown) to refuel fuel tank 18 is shown in FIG. 7. Multi-stage flow controller 52 is shown in a solenoid-activated FIRST OPENED configuration to allow a small BLEED stream (B) of pressurized fuel vapor to flow from third vapor port 26 through the central vent aperture 56 formed in perforated partition plate 50, and a small-diameter central vapor-flow orifice 52SO formed in each of the O-ring seal 74 and the spring cap 82 of storage-side vapor-flow regulator 52S in response to activation of solenoid 54. The FIRST OPENED configuration of multi-stage flow controller 52 causes the solenoid 54 to produce a magnetic field in the movable armature 52A associated with tank-side vapor-flow regulator 52T to move the armature 52A upwardly from a CLOSED position engaging the O-ring seal 74 of storage-side vapor-flow regulator 52S as shown in FIG. 5 to an OPENED position disengaging the O-ring seal 74 of storage-side vapor-flow regulator 52S as shown in FIG. 8.

An enlarged view taken from the circular region of FIG. 8 is provided in FIG. 9 to show a small BLEED flow stream (B) of pressurized fuel vapor that passes from third vapor port 26 of housing 12 through spaces formed in the large-diameter compression (vacuum) spring 72 of tank-side vapor-flow regulator 52T and then through the central valve aperture 56 formed in perforated partition plate 50. And then, owing to activation of solenoid 54 to cause upward movement of movable armature 52A relative to perforated partition plate 50 to disengage the annular seal 74 of the storage-side vapor-flow regulator 52S, the small BLEED flow stream (B) is able to pass through now-opened vent vapor-flow orifices 52SO formed in each of the annular seal 74 and the companion spring cap 82 of storage-side vapor-flow regulator 52S and then pass through spaces formed in the small-diameter compression (pressure) spring 80 of storage-side vapor-flow regulator 52S into storage cavity 30 of media storage body 20.

Figure 11:
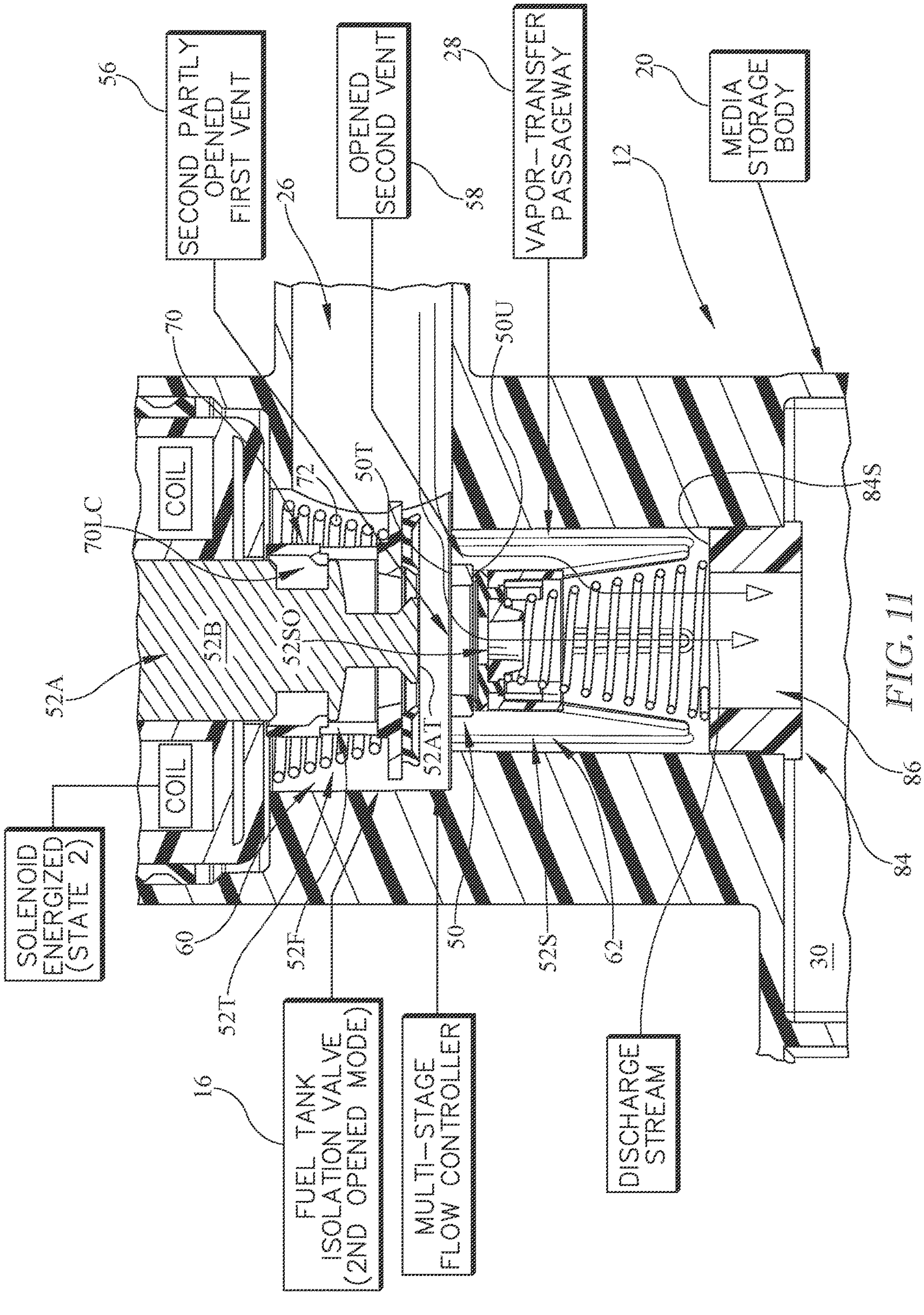
FIG. 11 is a detail view of FIG. 10 when the fuel tank isolation valve is in the SECOND OPENED mode showing flow of the DISCHARGE stream of pressurized fuel vapor through the SECOND partly opened central vent and then into the storage cavity of the media storage body.

A SECOND STAGE of a refueling depressurization of fuel tank 18 takes place when fuel tank isolation valve 16 is in the SECOND OPENED mode as suggested in FIGS. 10 and 11. Multi-stage flow controller 52 is shown in a pressure-activated SECOND OPENED configuration to vent pressurized fuel vapor from the third vapor port 26 into the storage cavity 30 of media storage body 20 after the pressure of the pressurized fuel vapor extant in the third vapor port 26 has risen from a first pressure (P1) suggested in FIG. 8 to a higher second pressure (P2) suggested in FIG. 10 to urge top hat-shaped spring cap 70 and the associated O-ring seal 74 upwardly away from perforated partition plate 50 to compress the large-diameter compression (vacuum) spring 72 and open the normally closed six orbital vent apertures 58*a-f* formed in perforated partition plate 50 while the central vent aperture 56 found in perforated partition plate 50 remains open so that a greater volume of pressurized fuel vapor can be discharged from fuel tank 18 to media storage body 20 via vapor-transfer passageway 28 of housing 12.

An enlarged view taken from the circled region of FIG. 10 is provided in FIG. 11 to show the flow of pressurized fuel vapor that passes from the third vapor port 26 through the central and orbital vent apertures 56, 58 formed in perforated partition plate 50 into the storage cavity 30 of media storage body 20 during refueling of fuel tank 18. Solenoid 54 is energized to move movable armature 52A upwardly. This activity causes lift flange 52F of movable armature 52A to engage an underside of lift catch 70LC of top hat-shaped spring cap 70 to apply a lifting force to top hat-shaped spring cap 70 so as to move seal ring 74 included in tank-side vapor-flow regulator 52T upwardly to cause seal ring 74 to disengage the underlying perforated partition plate 50 and open the six orbital vent apertures 58*a-f* formed in perforated partition plate 50 while solenoid 54 remains energized.

Development of unwanted vacuum conditions in fuel tank 18 at a time when no tank refueling activity is taking place is shown in FIGS. 12, 13, and 14. Multi-stage flow controller 52 is shown in a vacuum-activated THIRD OPENED configuration after vacuum (e.g. negative pressure) conditions have developed in fuel tank 18 in which tank-side vapor-flow regulator 52T has moved upwardly to disengage the underlying perforated partition plate 50 to open the six orbital vent apertures 58*a-f* found in perforated partition plate 50 so as to allow fuel vapor comprising atmosphere air entrained with fuel droplets de-adsorbed from storage cavity 30 of media storage body 20 to flow into vapor-transfer passageway 28 of housing 12 through the six orbital vent apertures 58*a-f* and through third vapor port 26 into fuel tank 18 to relieve the unwanted vacuum conditions in fuel tank 18.

An enlarged view taken from the circled region of FIG. 13 is provided in FIG. 14 to show that the stream of fuel vapor flowing from the storage cavity 30 of media storage body 20 through the six orbital vent apertures 58*a-f* formed in perforated partition plate 50 after solenoid 54 has been energized further, in effect, to apply an upward lifting force to top hat-shaped spring cap 70 and the companion seal ring 74 of tank-side vapor-flow regulator 52T. This lifting force moves those components in an upward direction relative to the housing 12 to compress the large-diameter compression (vacuum) spring 72 to open the six orbital vent apertures 58*a-f* while the central vent aperture 56 remains closed to allow such fuel vapor to flow through the third vapor port 26 into fuel tank 18 to relieve unwanted vacuum conditions in fuel tank 18.

During development of unwanted over-pressure conditions in the fuel tank 18 at a time when no tank refueling activity is taking place is shown in FIG. 15. Multi-stage flow controller 52 is shown in a pressure-activated FOURTH OPENED configuration after the pressure of fuel vapor extant in fuel tank 18 has risen above a predetermined maximum pressure level in which storage-side vapor-flow regulator 52S has moved downwardly to disengage the overlying perforated partition plate 50 to open a portion of the central vent aperture 56 formed in perforated partition plate 50 that extends around a cylindrical body 52B included in movable armature 52A to allow pressurized fuel vapor (P3) to flow from fuel tank 18 to storage cavity 30 of media storage body 20.

An enlarged view taken from the circled region of FIG. 15 is provided in FIG. 16 to show that the stream of pressurized fuel vapor (P3) flowing from the third vapor port 26 through the central vent aperture 56 formed in perforated partition plate 50 to establish first vent 56 functions to apply a downward pushing force (F) to the topsides of the spring cap 82 and the companion annular seal 82S of storage-side vapor-flow regulator 52S. This downward pushing force (F) pushes those components in a downward direction relative to the housing 12 to compress the small-diameter compression (pressure) spring 80 to open most of the central valve aperture 56 while the six orbital vent apertures 56 *a-f* establishing second vent 58 remain closed to allow such pressurized fuel vapor (P3) to flow into storage cavity 30 of media storage body 20 to relieve unwanted over-pressure conditions in fuel tank 18.

A tank venting system 10 in accordance with the present disclosure comprises a housing 12, a carbon bed 14 located in a storage cavity 30 defined by housing 12, and a fuel tank isolation valve 16 as shown in FIG. 1. Housing 12 includes a vapor-transfer passageway 28 in which the fuel tank isolation valve 16 is located so that the fuel tank isolation valve 16 is integral with the housing 12. Fuel tank isolation valve 16 has a normally CLOSED mode and four OPENED modes in accordance with the present disclosure.

Housing 12 includes a media storage body 20 formed to define the storage cavity 30, a plurality of vapor ports 22, 24, 26, and vapor-transfer passageway 28 arranged to interconnect storage cavity 30 of media storage body 20 and a fuel tank port 26 associated with a fuel tank 18 in fluid communication so that pressurized fuel vapor can flow back and forth between fuel tank 18 and media storage body 20. Plurality of vapor ports includes a first vapor port 22, a second vapor port 24, and a third vapor port 26 as shown in FIGS. 1-4, 8, and 12. First vapor port 22 is arranged to interconnect storage cavity 30 of media storage body 20 and an atmosphere 21 surrounding tank venting system 10 in fluid communication. Second vapor port 24 is arranged to interconnect storage cavity 30 of media storage body 20 and engine 19 in fluid communication. Third vapor port 26, also referred to as fuel tank vapor port 26, is in fluid communication with fuel tank 18.

Media storage body 20 includes a storage body canister 34 that defines storage cavity 30, a storage body closure 36, and a top-side vapor-transfer passageway closure 38 as shown in FIGS. 3-5, 7, and 12. Storage body canister 34 has a bottom opening 32 that opens into storage cavity 30 from a bottom of storage body canister 34. Storage body closure 36 couples to storage body canister 34 to close the opening 32 to storage cavity 30. Top-side closure 38 couples to a top-side of storage body canister 34 to close off a tank-side chamber 60 of vapor-transfer passageway 28.

Storage body canister 34 includes an outer canister wall 40, a first flow divider 42A, and a second flow divider 42B as shown in FIGS. 3, 5, and 12. Outer canister wall 40 defines storage cavity 30, while first and second flow dividers 42A, 42B divide storage cavity 30 into different compartments 44, 46, 48. First flow divider 42A extends from outer canister wall 40 into storage cavity 30 between vapor-transfer passageway 28 and second vapor port 24. Second flow divider 42B extends from outer canister wall 40 into storage cavity 30 between second vapor port 24 and first vapor port 22.

A first compartment 44 is formed between outer canister wall 40 and first flow divider 42A, a second compartment 46 is formed between first flow divider 42A and second flow divider 42B, and a third compartment 48 is formed between second flow divider 42B and outer canister wall 40. Vapor-transfer passageway 28 opens into first compartment 44. First vapor port 22 opens into the second compartment 46. Second vapor port 24 opens into third compartment 48.

First flow divider 42A has a first length L1 and second flow divider 42B has a second length L2 as shown in FIG. 5. The second length L2 is greater than the first length L1. In this way, the flow path from vapor-transfer passageway 28 to first vapor port 22 is shorter than the flow path from vapor-transfer passageway 28 to second vapor port 24. Fuel tank isolation valve 16 controls the flow fuel vapor and air between fuel tank 18 and media storage body 20 to the different ports 22, 24, 26 in the housing 12.

Fuel tank isolation valve 16 includes a perforated partition plate 50 as shown in FIGS. 2, 3, and 6B. Perforated partition plate 50 is mounted in a stationary position in the vapor-transfer passageway 28 formed housing 12 to partition the vapor-transfer passageway 28 so as to establish a tank-side chamber 60 communicating with the third vapor port 26 and a storage-side chamber 62 communicating with the storage cavity 30 to cause a first-side surface 50T of stationary perforated partition plate 50 to intercept fuel vapor flowing in the vapor-transfer passageway 28 from the third vapor port 26 to the storage cavity 30 and to cause an opposite second-side surface 50U of stationary perforated partition plate 50 to intercept fuel vapor flowing in the vapor-transfer passageway 28 from the storage cavity 30 to the third vapor port 26.

Stationary perforated partition plate 50 is formed as shown in FIGS. 2, 3, and 6B to include a first vent 56 opening through first-side surface 50T into the tank-side chamber 60 of the vapor-transfer passageway 28 and also opening through second-side surface 50U into the storage-side chamber 62 of the vapor-transfer passageway 28. Stationary perforated partition plate 50 is also formed to include a second vent 56 separated from the first vent 56 to open through first-side surface 50T into the tank-side chamber 60 and also to open through second-side surface 50U into the storage-side chamber 62.

Fuel tank isolation valve 16 further includes a multi-stage flow controller 52 configured in accordance with the present disclosure as suggested in FIG. 3 to provide for normally closing the first and second vents 56, 58 formed in stationary perforated partition plate 50 as shown in FIGS. 2, 4, and 5. The first and second vents 56, 58 are closed normally to block flow of fuel vapor through each of first and second vents 56, 58 to establish a normally CLOSED mode of fuel tank isolation valve 16 so that fuel vapor cannot flow through vapor-transfer passageway 28 between fuel tank 18 and media storage body 20 of housing 12 so as to isolate fuel tank 18 normally from fluid communication with media storage body 20.

Multi-stage flow controller 52 is also configured as shown in FIGS. 7 and 8 in accordance with the present disclosure to provide for temporarily restricting flow of pressurized fuel vapor extant in the tank-side chamber 60 through the first vent 56 formed in stationary perforated partition plate 50 into the storage-side chamber 62 to initiate partial opening of first vent 56 to realize a first restriction to flow of pressurized fuel vapor through first vent 56 characterized by a FIRST partly opened state of first vent 56 while second vent 58 remains closed so as to establish a FIRST OPENED mode of the fuel tank isolation valve 16 as shown in FIGS. 9 and 9A. This activity causes a BLEED stream (B) of pressurized fuel vapor to be discharged from the tank-side chamber 60 into the storage-side chamber 62 via FIRST partly opened first vent 56 formed in stationary perforated partition plate 50 during an early stage of refueling fuel tank 18 while the pressure of pressurized fuel vapor in the third vapor port 26 remains below a relatively higher second pressure (P2) so that pressurized fuel vapor is admitted into the storage-side chamber 62 to increase pressure extant in the storage-side chamber 62.

Multi-stage flow controller 52 is also configured as shown in FIG. 10 in accordance with the present disclosure to provide for temporarily opening the second vent 58 formed in the stationary perforated partition plate 50 while restricting flow of pressurized fuel vapor through first vent 56 characterized by a SECOND partly opened state of first vent 56 formed in stationary perforated partition plate 50 to realize a different second restriction to flow of pressurized fuel vapor through first vent 56 so as to establish a SECOND OPENED mode of fuel tank isolation valve 16 as shown in FIG. 10. This activity causes a relatively greater DISCHARGE stream (D) of pressurized fuel vapor to be discharged from the tank-side chamber 60 into the storage-side chamber 62 via SECOND partly opened first vent 56 and second vent 58 formed in stationary perforated partition plate 50 during a relatively later stage of refueling of fuel tank 18 after pressure of the pressurized fuel vapor extant in the third vapor port 26 has risen to at least the relatively higher second pressure (P2) so that a greater volume of pressurized fuel vapor flowing in the third vapor port 26 into the tank-side chamber 60 can be discharged through first and second vents 56, 58 formed in stationary perforated partition plate 50 to flow through the vapor-transfer passageway 28 into the storage cavity 30 of media storage body 20 to dissipate pressure in fuel tank 18.

Multi-stage flow controller 52 is further configured as shown in FIGS. 12 and 13 in accordance with the present disclosure to provide for temporarily opening second vent 58 formed in stationary perforated partition plate 50 while first vent 56 is closed so as to establish a THIRD OPENED mode of fuel tank isolation valve 16 during development of unwanted vacuum conditions in fuel tank 18 as shown in FIG. 14. This activity allows fuel vapor including atmospheric air to flow from storage cavity 30 of media storage body 20 to fuel tank 18 via vapor-transfer passageway 28 through second vent 56 formed in stationary perforated partition plate 50 owing to development of vacuum conditions in fuel tank 18 so that fuel vapor flowing in the storage cavity 30 flows through the vapor-transfer passageway 28 into the third vapor port 26 and then flows into fuel tank 18 to dissipate the unwanted vacuum conditions in fuel tank 18.

Multi-stage flow controller 52 is still further configured as shown in FIG. 15 in accordance with the present disclosure to provide for temporarily restricting flow of pressurized fuel vapor extant in the tank-side chamber 60 through first vent 56 formed in stationary perforated partition plate 50 to realize a third restriction to flow of pressurized fuel vapor through first vent 56 that is characterized by THIRD partly opened state that is different from each of the first and second restrictions to flow of pressurized fuel vapor through first vent 56 while second vent 58 is closed so as to establish a FOURTH OPENED mode of fuel tank isolation valve 16 during development of unwanted over-pressure conditions in fuel tank 18 after pressure of pressurized fuel vapor extant in the third vapor port 26 has risen above the relatively higher second pressure (P2) to at least a third pressure (P3) as shown in FIG. 16. This activity causes a stream of over-pressure fuel vapor to be discharged from the tank-side chamber 60 into the storage-side chamber 62 via THIRD partly opened first vent 56 formed in stationary perforated partition plate 50 so that over-pressure fuel vapor flowing in the third vapor port 26 flows through the vapor-transfer passageway 28 into the storage cavity 30 of media storage body 20 to dissipate unwanted over-pressure conditions in fuel tank 18.

Multi-stage flow controller 52 includes tank-side and storage-side vapor-flow regulators 52T, 52S and a movable armature 52A that is operationally linked to a solenoid 54 as shown in FIGS. 2 and 3. Tank-side vapor-flow regulator 52T is mounted for movement in the tank-side chamber 60 of the vapor-transfer passageway 28 relative to housing 12 toward and away from stationary perforated partition plate 50 to open and close second vent 58 formed in stationary perforated partition plate 50. Storage-side vapor-flow regulator 52S is mounted for movement in the storage-side chamber 62 of the vapor-transfer passageway 28 relative to housing 12 toward and away from tank-side vapor-flow regulator 52T to regulate flow of pressurized fuel vapor through first vent 56 formed in stationary perforated partition plate 50. Movable armature 52A is mounted for up-and-down movement in an armature-receiving channel formed in the tank-side vapor-flow regulator 52T relative to stationary perforated partition plate 50 between a closed position extending through first vent 56 to engage storage-side vapor-flow regulator 52S while storage-side vapor-flow regulator 52S engages second-side surface 50U of stationary perforated partition plate 50 to close first vent 56 when fuel tank isolation valve 16 is in the normally CLOSED mode and several opened positions disengaging storage-side vapor-flow regulator 52S to allow pressurized fuel vapor extant in the tank-side chamber 60 to flow through first vent 56 to the storage-side chamber 62. In the normally CLOSED mode, no part of movable armature 52A touches or engages regulator 52T to close orbital vent apertures 56, 58 of partition plate 50.

Storage-side vapor-flow regulator 52S is formed to include a vapor-flow orifice 52SO shown in FIG. 3 that communicates with first vent 56 to receive pressured fuel vapor discharged through first vent 56 when storage-side vapor-flow regulator 52S is arranged in the storage-side chamber 62 to engage second-side surface 50U of stationary perforated partition plate 50 as suggested in FIGS. 7 and 8. Movable armature 52A includes a distal tip 52AT that is arranged to engage storage-side vapor-flow regulator 52S to close vapor-flow orifice 52SO to block discharge of pressurized fuel vapor extant in first vent 56 into the storage-side chamber 62 when fuel tank isolation valve 16 is in the normally CLOSED mode and that is separated from vapor-flow orifice 52SO by a first distance when fuel tank isolation valve 16 is in the FIRST OPENED mode as suggested in FIG. 9A and that is separated from vapor-flow orifice 52SO by a second distance that is greater than the first distance when the fuel tank isolation valve 16 is in the SECOND OPENED mode as suggested in FIG. 11.

Movable armature 52A includes a distal tip 52AT that is arranged to engage storage-side vapor-flow regulator 52S to close a vapor-flow orifice 52SO that is formed in storage-side vapor-flow regulator 52S to communicate with first vent 56 and the storage-side chamber 62 when movable armature 52A is in the closed position and the storage-side vapor-flow regulator 52S is moved to engage second-side surface 50U of stationary perforated partition plate 50 as suggested in FIGS. 6 and 6A and also in FIG. 11. This activity causes movable armature 52A to cooperate with storage-side vapor-flow regulator 52S to close first vent 56 when fuel tank isolation valve 16 is in the normally CLOSED mode and the THIRD OPENED mode.

Distal tip 52AT of movable armature 52A includes a downwardly facing bottom surface facing toward the vapor-flow orifice 52SO formed in storage-side vapor-flow regulator 52S. The downwardly facing bottom surface of distal tip 52AT is arranged to lie in close proximity to and at a first distance from first-side surface 50T of stationary perforated partition plate 50 when fuel tank isolation valve 16 is in the FIRST OPENED mode as suggested in FIGS. 8, 9, and 9A. The downwardly facing bottom surface of distal tip 52AT is arranged to lie in close proximity to and at a second distance from second-side surface 50U of stationary perforated partition plate 50 when fuel tank isolation valve 16 is in the SECOND OPENED mode as suggested in FIG. 11.

Movable armature 52A further includes a top end 52E arranged to lie in a spaced-apart relation to distal tip 52AT as suggested in FIG. 5. Multi-stage flow controller 52 further includes a compression spring 52AS having a first end engaging top end 52E of movable armature 52A and an opposite second end acting against the top-side vapor-transfer passageway closure 38 of housing 12 normally to urge movable armature 52A in the vapor-transfer passageway 28 toward storage-side vapor-flow regulator 52S to cause distal tip 52AT to close the vapor-flow orifice 52SO formed in storage-side vapor-flow regulator 52S as suggested in FIGS. 6 and 14.

Movable armature 52A further includes an elongated body 52B arranged to interconnect top end 52E and distal tip 52AT and a radially outwardly extending lift flange 52F having an inner end coupled to the elongated body 52B as suggested in FIG. 3. Lift flange 52F is arranged to extend radially outwardly from central vertical axis 39A. Tank-side vapor-flow regulator 52T further includes a tank-side compression spring 72 having a first end engaging movable tank-side closure 70 and an opposite second end acting against the top-side vapor-transfer passageway closure 38 of housing 12 normally to urge movable tank-side closure 70 to engage first-side surface 50T of stationary perforated partition plate 50 to close second vent 58 as shown in FIGS. 5, 6, and 6A. Movable tank-side closure 70 further includes a sleeve 70S arranged to surround a portion of the elongated body 52B of movable armature 52A during movement of movable armature 52A relative to housing 12. A lift catch 70LC is coupled to sleeve 70S and arranged to extend radially inwardly toward central vertical axis 39A to engage the radially outwardly extending lift flange 52F of movable armature 52A during upward movement of distal tip 52AT of movable armature 52A away from movable tank-side closure 70 in response to energization of solenoid 54 included in fuel tank isolation valve 16 and limited to movable armature 52A when fuel tank isolation valve 16 is in the FIRST OPENED mode and the SECOND OPENED mode.

In the normally CLOSED mode, elongated body 52B, distal tip 52AT, and lift flange 52F do not engaged with top hat-shaped spring cap 70. Rather spring 72 biases top hat-shaped spring cap 70 into engagement with topside 50T of partition plate 50. Top hat-shaped spring cap 70 has openings so that lift flange 52F of movable armature 52A does not engage any part of tank-side vapor-flow regulator 52T. It is only when valve 16 is in SECOND OPENED mode does movable armature 52A engage radially inwardly extending lift catch 70LC of top hat-shaped spring cap 70 to compress spring 72 and open orbital vent apertures 56, 58.

Movable tank-side closure 70 is top-hat-shaped and further includes an annular base 70B coupled to sleeve 70S and arranged to extend radially outwardly away from sleeve 70S to face toward top-side surface 50T of partition plate 50. First end of tank-side compression spring 72 engages annular base 70B of movable tank-side closure 70. A portion of tank-side compression spring 72 is coiled to surround sleeve 70S.

Distal tip 52AT of movable armature 52A is located as suggested in FIGS. 8, 9, and 9A in a first of the several opened positions in the tank-side chamber 60 outside of first vent 56 to position distal tip 52AT at a first distance from storage-side vapor-flow regulator 52S to lie in spaced-apart relation to vapor-flow orifice 52SO and to lie in close proximity to second-side surface 50U of stationary perforated partition plate 50 to establish the first restriction to flow of fuel vapor through first vent 56 when fuel tank isolation valve 16 is in the FIRST OPENED mode. This position of distal tip 52AT establishes the FIRST partly opened state of first vent 56.

Distal tip 52AT of the movable armature 52A is located as suggested in FIGS. 10 and 11 in a raised second of the several opened positions in the tank-side chamber 60 to position distal tip 52AT at a second distance from storage-side vapor-flow regulator 52S that is greater than the first distance while storage-side vapor-flow regulator 52S remains engaged with second-side surface 50U of stationary perforated partition plate 50 to cause pressurized fuel vapor exiting first vent 56 to flow through the vapor-flow orifice 52SO formed in storage-side vapor-flow regulator 52S to establish the second restriction to flow of pressurized fuel vapor through first vent 56 when fuel tank isolation valve 16 is in the SECOND OPENED mode. This position establishes the SECOND partly opened state of first vent 56.

Tank-side vapor-flow regulator 52T is arranged as suggested in FIGS. 5, 6, and 6A to engage first-side surface 50T of stationary perforated partition plate 50 to close second vent 58 formed in stationary perforated partition plate 50 when fuel tank isolation valve 16 is in the normally CLOSED mode. Tank-side vapor-flow regulator 52T is arranged to disengage first-side surface 50T of stationary perforated partition plate 50 when fuel tank isolation valve 16 is in the THIRD OPENED mode.

Storage-side vapor-flow regulator 52S is arranged as suggested in FIGS. 15 and 16 to disengage second-side surface 50U of stationary perforated partition plate 50 while distal tip 52AT of movable armature 52A lies in first vent 56 formed in stationary perforated partition plate 50 in a third of the several opened positions to establish the third restriction of flow of pressurized fuel vapor through first vent 56 and while tank-side vapor-flow regulator 52T is arranged to engage first-side surface 50T of stationary perforated partition plate 50 to close second vent 58 formed in stationary perforated partition plate 50 when fuel tank isolation valve 16 is in the FOURTH OPENED mode. This position establishes the THIRD partly opened state of first vent 56.

Each of tank-side and storage-side vapor-flow regulators 52T, 52S is arranged to move relative to housing 12, stationary perforated partition plate 50, and one another along a single vertical axis 39A. Single vertical axis 39A extends through the tank-side chamber 60, the first vent 56 formed in stationary perforated partition plate 50, and the storage-side chamber 62.

Multi-stage flow controller 52 further includes a movable armature 52A mounted for movement in an armature-receiving channel formed in tank-side vapor-flow regulator 52T relative to housing 12 and tank-side vapor-flow regulator 52T and toward and away from stationary perforated partition plate 50. Storage-side vapor-flow regulator 52S includes a fuel-vapor flow restrictor 82 that is formed to include a small-diameter vapor-flow orifice 52SO that is relatively smaller in size than a central vent aperture 56 established by first vent 56 and a seal ring 82S arranged to surround the small-diameter vapor-flow orifice 52SO and to extend toward second-side surface 50U of stationary perforated partition plate 50. The small-diameter vapor-flow orifice 52SO is located to open into storage-side chamber 62 and also located to communicate with the central vent aperture 56 established by first vent 56 formed in stationary perforated partition plate 50 when storage-side vapor-flow regulator 52S is moved in the storage-side chamber 62 to engage second-side surface 50U of stationary perforated partition plate 50 so as to conduct pressurized fuel vapor from the tank-side chamber 60 to the storage-side chamber 62 via the central vent aperture 56 and small-diameter vapor-flow orifice 52SO.

Movable armature 52A includes a distal tip 52AT arranged to move relative to the stationary perforated partition plate 50 between projected, retracted, and intermediate positions. Distal tip 52AT is arranged to face downwardly toward the vapor-flow orifice 52SO formed in storage-side vapor-flow regulator 52S.

In the projected positon, movable armature 52A extends into the central vent aperture 56 formed in stationary perforated partition plate 50 to engage seal ring 82S included in storage-side vapor-flow regulator 52S as suggested in FIGS. 6 and 13. This engagement closes the small-diameter vapor-flow orifice 52SO formed in fuel-vapor flow restrictor to block flow of pressurized fuel vapor extant in the tank-side chamber 60 and in the central vent aperture 56 formed in stationary perforated partition plate 50 through the small-diameter vapor-flow orifice 52SO formed in storage-side vapor-flow regulator 52S when the fuel tank isolation valve 16 is in the NORMALLY CLOSED mode and to block flow of fuel vapor extant in the storage-side chamber 62 through the small-diameter vapor-flow orifice 52SO formed in storage-side vapor-flow regulator 52S and first vent 56 formed in stationary perforated partition plate 50 when fuel tank isolation valve 16 is in the THIRD OPENED mode.

In the retracted position, movable armature 52A is withdrawn from the central vent aperture 56 formed in stationary perforated partition plate 50 as suggested in FIGS. 10 and 11. This withdrawal allows flow of the relatively greater DISCHARGE stream (D) of pressurized fuel vapor to be discharged from the tank-side chamber 60 through first and second vents 56, 58 and through small-diameter vapor-flow orifice 52SO into the storage-side chamber 62 in transit to storage cavity 30 in media storage body 20 when movable armature 52A is in the SECOND OPENED mode.

The intermediate position is located between the projected and retracted positions as shown in FIGS. 8, 9 an 9A. Placement of distal tip 52AT in the intermediate position causes the BLEED stream (B) of pressurized fuel vapor to be discharged from the tank-side chamber 60 into the storage-side chamber 62 via first vent 56 when fuel tank isolation valve 16 is in the FIRST OPENED mode.

Each of the movable armature 52A and tank-side and storage-side vapor-flow regulators 52T, 52S is arranged to move relative to housing 12, stationary perforated partition plate 50, and one another along a single vertical axis 39A that extends through the tank-side chamber 60, the first vent 56 formed in stationary perforated partition plate 50, the small-diameter vapor-flow orifice 52SO formed in fuel-vapor flow restrictor 82 of storage-side vapor-flow regulator 52S, and the storage-side chamber 62. Each of the tank-side vapor-flow regulator 52T, movable armature 52A, and storage-side vapor-flow regulator 52S is mounted in the vapor-transfer passageway 28 formed housing 12 for independent movement relative to one another and to stationary perforated partition plate 50 during a mode change of fuel tank isolation valve 16 between the normally CLOSED mode and each of the FIRST, SECOND, THIRD AND FOURTH OPENED modes.

Stationary perforated partition plate 50 of fuel tank isolation valve 16 arranged to lie wholly within the vapor-transfer passageway 28 formed in housing 12. The first vent 56 is established by a central vent aperture 56 formed in stationary perforated partition plate 50 and second vent 58 is established by a series of orbital vent apertures 58*a-f* formed in stationary perforated partition plate 50 and arranged to surround central vent aperture 56.

In hybrid vehicles, the internal combustion engine included in the vehicle operates intermittently and the fuel tank system closed off from the surrounding atmosphere, which may create a need to control/regulate the fuel vapor in the system. Hybrid vehicles also typically have relatively small fuel tanks compared to other vehicles. When the vehicle uses the electric motor (i.e. the engine is not being used), the pressure of the fuel vapor in the fuel tank may increase.

This may make opening fuel system lines when ready for use a challenge. Further, if the increased pressure in the fuel tank is not released, the fuel tank may become damaged or even explode. Fuel tank isolation valve 16 controls the flow fuel vapor and air between fuel tank 18 and media storage body 20 used to store the pressurized fuel vapor to release built up pressure in fuel tank 18 at different stages.

Fuel tank isolation valve 16 isolates media storage body 20 from the fuel tank 18 in the PHEV. In the normally CLOSED mode, valve 16 blocks the flow of fuel vapor from tank 18 to storage cavity 30 of media storage body 20 as shown in FIG. 5.

Fuel tank isolation valve 16 has four different open modes (the first opened mode as shown in FIG. 8, the second opened mode as shown in FIG. 10, the third opened mode as shown in FIG. 13, and the fourth opened mode as shown in FIG. 15) to regulate the flow of fuel vapor between fuel tank 18 and media storage body 20 based on different conditions of the system. In the case of over-pressure conditions, valve 16 changes to the fourth mode to allow a release a large amount of pressure from fuel tank 18.

Conversely, if there is vacuum conditions in fuel tank 18, fuel tank isolation valve 16 may change to third opened mode to alleviate unwanted vacuum conditions. Once the vehicle switches to using engine 19, fuel tank isolation valve 16 may change to one of first opened mode, second opened mode, and fourth opened mode to allow the fuel vapor to flow from fuel tank 18 through media storage body 20 and to second vapor port 24 to the engine 19 to be burned with the fuel.

Releasing the built up pressure of the fuel vapor in the fuel tank may also be important during refueling of the fuel tank. When a person uses a fuel-dispersion pump nozzle to begin to discharge fuel into a filler neck leading to the fuel tank, fuel tank isolation valve 16 changes from closed mode to first opened mode to vent some displaced fuel vapor from fuel tank 18. After refueling begins and fuel is being discharged at a constant rate into fuel tank 18, fuel tank isolation valve 16 changes to second opened mode to vent more displaced fuel vapor.

Housing 12 includes media storage body 20 that is formed to define storage cavity 30, vapor ports 22, 24, 26, and vapor-transfer passageway 28 so that fuel tank isolation valve 16 may be integral with housing 12. Fuel tank isolation valve 16 is located in vapor-transfer passageway 28 to control the flow of pressurized fuel vapor from flow to and from third vapor port 26 to storage cavity 30 of media storage body 20. Locating the Fuel tank isolation valve 16 in vapor-transfer passageway 28 reduces leak paths between the fuel tank 18 and the engine 19.

Media storage body 20 includes a storage body canister 34 that defines storage cavity 30 and a storage body closure 36 that couples to storage body canister 34 to close an opening 32 to storage cavity 30. Storage body canister 34 of media storage body 20 is a monolithic component of plastic material in the illustrative embodiment. Storage body canister 34 is monolithic such that storage cavity 30, plurality of vapor ports 22, 24, 26, and vapor transfer passageway 28 are monolithic. In some embodiments, the monolithic component may be injection molded. In other embodiments, the monolithic component may be extruded.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A tank venting system comprising a housing including a media storage body formed to define a storage cavity, a plurality of vapor ports including (i) a first vapor port arranged to interconnect the storage cavity of the media storage body and an atmosphere surrounding the tank venting system in fluid communication, (ii) a second vapor port arranged to interconnect the storage cavity of the media storage body and an engine in fluid communication, and (iii) a third vapor port in fluid communication with a fuel tank; and a vapor-transfer passageway arranged to interconnect the storage cavity and the third vapor port to enable transfer of fuel vapor flowing from the fuel tank through the third port to the storage cavity of the media storage body and to enable transfer of hydrocarbon-laiden vapor flowing from the storage cavity of the media storage body through the third vapor port to the fuel tank, a carbon bed located in the storage cavity of the media storage body that is configured to absorb hydrocarbons in the fuel vapor flowing into and out of the media storage body through each of the plurality of vapor ports, and a fuel tank isolation valve located in the vapor-transfer passageway of the housing that is configured to regulate flow of fuel vapor in the vapor-transfer passageway between the third vapor port and the storage cavity of the media storage body, wherein the fuel tank isolation valve includes a bottom mount member independent of the housing that is located in an opening of the vapor-transfer passageway that opens directly into the storage cavity to provide a shoulder surface engaged by other components of the fuel tank isolation valve to retain the fuel tank isolation valve in the opening of the vapor-transfer passageway, and wherein the bottom mount member includes a through hole that opens to the vapor-transfer passageway and the storage cavity of the media storage body.

2. The system of claim 1, wherein the media storage body includes a storage body canister that defines the storage cavity and a bottom opening that opens into the storage cavity and a storage body closure that couples to the storage body canister to close the opening to the storage cavity.

3. The tank venting system of claim 2, wherein the storage body canister of the media storage body is formed to define the plurality of vapor ports and the vapor transfer passageway, and wherein the storage body canister of the media storage body is a monolithic component of plastic material.

4. The tank venting system of claim 2, wherein the storage body canister includes an outer canister wall that defines the portion of the storage cavity, a first flow divider that extends from the outer canister wall into the storage cavity between the vapor-transfer passageway and the second vapor port, and a second flow divider that extends from the outer canister wall into the storage cavity between the second vapor port and the first vapor port, and wherein the first flow divider has a first length, the second flow divider has a second length, and the second length is greater than the first length.

5. A tank venting system comprising a housing including a media storage body formed to define a storage cavity, a plurality of vapor ports including (i) a first vapor port arranged to interconnect the storage cavity of the media storage body and an atmosphere surrounding the tank venting system in fluid communication, (ii) a second vapor port arranged to interconnect the storage cavity of the media storage body and an engine in fluid communication, and (iii) a third vapor port in fluid communication with a fuel tank; and a vapor-transfer passageway arranged to interconnect the storage cavity and the third vapor port to enable transfer of fuel vapor flowing from the fuel tank through the third port to the storage cavity of the media storage body and to enable transfer of hydrocarbon-laiden vapor flowing from the storage cavity of the media storage body through the third vapor port to the fuel tank, a carbon bed located in the storage cavity of the media storage body that is configured to absorb hydrocarbons in the fuel vapor flowing into and out of the media storage body through each of the plurality of vapor ports, and a fuel tank isolation valve located in the vapor-transfer passageway of the housing that is configured to regulate flow of fuel vapor in the vapor-transfer passageway between the third vapor port and the storage cavity of the media storage body, wherein the fuel tank isolation valve includes a stationary perforated partition plate located in the vapor-transfer passageway of the housing to partition the vapor-transfer passageway to establish a tank-side chamber communicating with the third vapor port on a first side of the stationary partition plate and a storage-side chamber communicating with the storage cavity of the media storage body on an opposite second side of the stationary partition plate.

6. The tank venting system of claim 5, wherein the fuel tank isolation valve further includes a storage-side vapor-flow regulator including a movable storage-side closure, a bottom mount member located in the storage-side chamber of the vapor-transfer passageway, and a storage-side compression spring having a first end engaging the movable storage-side closure and an opposite second end acting against a bottom mount member normally to urge the movable storage-side closure to engage the second-side surface of the stationary perforated partition plate to regulate flow of fuel vapor through a vent formed in the stationary perforated partition plate.

7. The tank venting system of claim 6, wherein the bottom mount member includes a through hole that opens to the vapor-transfer passageway and the storage cavity of the media storage body.

8. The tank venting system of claim 5, wherein the fuel tank isolation valve further includes a tank-side vapor-flow regulator mounted in the tank-side chamber to regulate flow of fuel vapor through a first vent formed in the stationary perforated partition plate to interconnect the tank-side and storage-side chambers in fluid communication, a spring-biased, solenoid-activated movable armature arranged in the tank-side chamber to extend through an armature-receiving channel formed in the tank-side vapor-flow regulator and to move relative to the tank-side vapor-flow regulator and the stationary perforated partition plate into a second vent separated from the first vent and formed in the stationary perforated partition plate, and a storage-side vapor-flow regulator mounted in the storage-side chamber to cooperate with the spring-biased solenoid-activated, movable armature to regulate flow of fuel vapor through the second vent formed in the stationary perforated partition plate.

9. The tank venting system of claim 8, wherein each of the tank-side and storage-side vapor-flow regulators are arranged to move relative to the housing, the stationary perforated partition plate, and one another along a central vertical axis that extends through the tank-side chamber, the first vent formed in the stationary perforated partition plate, the storage-side chamber, and the vapor-transfer passageway of the media storage body.

10. The tank venting system of claim 9, wherein the vapor-transfer passageway extends axially relative to the central vertical axis and opens into the storage cavity.

11. A tank venting system comprising a housing including a media storage body formed to define a storage cavity, a fuel-tank vapor port in fluid communication with a fuel tank, and a vapor-transfer passageway arranged to interconnect the storage cavity and the fuel-tank vapor port to enable transfer of fuel vapor between the fuel tank and the storage cavity of the media storage body through the fuel-tank port, a carbon bed located in the storage cavity of the media storage body configured to absorb hydrocarbons in the fuel vapor flowing into and out of the media storage body, and a fuel tank isolation valve located in the vapor-transfer passageway of the housing and configured to regulate flow of fuel vapor in the vapor-transfer passageway between the fuel-tank vapor port and the storage cavity of the media storage body, wherein the storage cavity, the fuel tank vapor port, and the vapor-transfer passageway are monolithic, wherein the fuel tank isolation valve includes a bottom mount member independent of the housing that is located in an opening of the vapor-transfer passageway that opens directly into the storage cavity to provide a shoulder surface engaged by other components of the fuel tank isolation valve to retain the fuel tank isolation valve in the opening of the vapor-transfer passageway, and wherein the bottom mount member includes a through hole that opens to the vapor-transfer passageway and the storage cavity of the media storage body.

12. The tank venting system of claim 11, further comprising an atmosphere vapor port arranged to interconnect the storage cavity of the media storage body and an atmosphere surrounding the tank venting system in fluid communication, a engine vapor port arranged to interconnect the storage cavity of the media storage body and an engine in fluid communication, and wherein the storage body canister includes an outer canister wall that defines the portion of the storage cavity, a first flow divider that extends from the outer canister wall into the storage cavity between the vapor-transfer passageway and the engine vapor port, and a second flow divider that extends from the outer canister wall into the storage cavity between the engine vapor port and the atmosphere vapor port.

13. A tank venting system comprising a housing including a media storage body formed to define a storage cavity, a fuel-tank vapor port in fluid communication with a fuel tank, and a vapor-transfer passageway arranged to interconnect the storage cavity and the fuel-tank vapor port to enable transfer of fuel vapor between the fuel tank and the storage cavity of the media storage body through the fuel-tank port, a carbon bed located in the storage cavity of the media storage body configured to absorb hydrocarbons in the fuel vapor flowing into and out of the media storage body, and a fuel tank isolation valve located in the vapor-transfer passageway of the housing and configured to regulate flow of fuel vapor in the vapor-transfer passageway between the fuel-tank vapor port and the storage cavity of the media storage body, wherein the storage cavity, the fuel tank vapor port, and the vapor-transfer passageway are monolithic, wherein the fuel tank isolation valve includes a storage-side vapor-flow regulator including a movable storage-side closure, a bottom mount member located in the storage-side chamber of the vapor-transfer passageway, and a storage-side compression spring having a first end engaging the movable storage-side closure and an opposite second end acting against a bottom mount member normally to urge the movable storage-side closure to engage a stationary perforated partition plate located in the vapor-transfer passageway of the housing to regulate flow of fuel vapor through a vent formed in the stationary perforated partition plate.

14. The tank venting system of claim 13, wherein the bottom mount member includes a through hole that opens to the vapor-transfer passageway and the storage cavity of the media storage body.

15. A tank venting system comprising a housing including a media storage body formed to define a storage cavity, a fuel-tank vapor port in fluid communication with a fuel tank, and a vapor-transfer passageway arranged to interconnect the storage cavity and the fuel-tank vapor port to enable transfer of fuel vapor between the fuel tank and the storage cavity of the media storage body through the fuel-tank port, a carbon bed located in the storage cavity of the media storage body configured to absorb hydrocarbons in the fuel vapor flowing into and out of the media storage body, and a fuel tank isolation valve located in the vapor-transfer passageway of the housing and configured to regulate flow of fuel vapor in the vapor-transfer passageway between the fuel-tank vapor port and the storage cavity of the media storage body, wherein the storage cavity, the fuel tank vapor port, and the vapor-transfer passageway are monolithic, wherein the fuel tank isolation valve includes a stationary perforated partition plate located in the vapor-transfer passageway of the housing to partition the vapor-transfer passageway to establish a tank-side chamber communicating with the fuel-tank vapor port on a first side of the stationary partition plate and a storage-side chamber communicating with the storage cavity of the media storage body on an opposite second side of the stationary partition plate.

16. The tank venting system of claim 15, wherein the fuel tank isolation valve further includes a tank-side vapor-flow regulator mounted in the tank-side chamber to regulate flow of fuel vapor through a first vent formed in the stationary perforated partition plate to interconnect the tank-side and storage-side chambers in fluid communication, a spring-biased, solenoid-activated movable armature arranged in the tank-side chamber to extend through an armature-receiving channel formed in the tank-side vapor-flow regulator and to move relative to the tank-side vapor-flow regulator and the stationary perforated partition plate into a second vent separated from the first vent and formed in the stationary perforated partition plate, and a storage-side vapor-flow regulator mounted in the storage-side chamber to cooperate with the spring-biased solenoid-activated, movable armature to regulate flow of fuel vapor through the second vent formed in the stationary perforated partition plate.

17. The tank venting system of claim 16, wherein each of the tank-side and storage-side vapor-flow regulators are arranged to move relative to the housing, the stationary perforated partition plate, and one another along a central vertical axis that extends through the tank-side chamber, the first vent formed in the stationary perforated partition plate, the storage-side chamber, and the vapor-transfer passageway of the media storage body.

18. The tank venting system of claim 11, wherein the vapor-transfer passageway extends along a central vertical axis and opens into the storage cavity.

* * * * *